United States Patent
Yoshida et al.

(10) Patent No.: US 12,206,067 B2
(45) Date of Patent: Jan. 21, 2025

(54) DIPHOSPHORUS PENTASULFIDE COMPOSITION FOR SULFIDE-BASED INORGANIC SOLID ELECTROLYTE MATERIAL

(71) Applicant: FURUKAWA CO., LTD., Tokyo (JP)

(72) Inventors: Tatsushi Yoshida, Tsukuba (JP);
Tetsuya Matsubara, Tsukuba (JP);
Motoshi Tamura, Tsukuba (JP);
Kazutomi Yamamoto, Tsukuba (JP)

(73) Assignee: FURUKAWA CO., LTD., Tokyo (JP)

( * ) Notice: Subject to any disclaimer, the term of this patent is extended or adjusted under 35 U.S.C. 154(b) by 599 days.

(21) Appl. No.: 17/598,657

(22) PCT Filed: Mar. 6, 2020

(86) PCT No.: PCT/JP2020/009705
§ 371 (c)(1),
(2) Date: Sep. 27, 2021

(87) PCT Pub. No.: WO2020/203045
PCT Pub. Date: Oct. 8, 2020

(65) Prior Publication Data
US 2022/0085407 A1    Mar. 17, 2022

(30) Foreign Application Priority Data
Mar. 29, 2019 (JP) .................. 2019-066562
Mar. 29, 2019 (JP) .................. 2019-066563

(51) Int. Cl.
*H01M 10/0562* (2010.01)
*C01B 25/14* (2006.01)
*H01M 10/0525* (2010.01)

(52) U.S. Cl.
CPC ......... *H01M 10/0562* (2013.01); *C01B 25/14* (2013.01); *H01M 10/0525* (2013.01); *H01M 2300/0068* (2013.01)

(58) Field of Classification Search
CPC ..... H01M 10/0562; H01M 2300/0065; H01M 2300/0068; C01B 25/14
See application file for complete search history.

(56) References Cited

U.S. PATENT DOCUMENTS

| 9,620,811 B2 | 4/2017 | Kambara et al. |
| 9,806,373 B2 | 10/2017 | Kambara et al. |

(Continued)

FOREIGN PATENT DOCUMENTS

| CN | 101402450 A | 4/2009 |
| CN | 104937761 A | 9/2015 |

(Continued)

OTHER PUBLICATIONS

Lin et al, Phosphorous Pentasulfi de as a Novel Additive for High Performance Lithium-Sulfur Batteries, Advanced Functional Materials, 23, 1064-1069, 2023. (Year: 2023).*

(Continued)

*Primary Examiner* — Amanda C. Walke
(74) *Attorney, Agent, or Firm* — WHDA, LLP

(57) ABSTRACT

Provided is a diphosphorus pentasulfide composition for a sulfide-based inorganic solid electrolyte material, in which a molar ratio (S/P) of a content of sulfur (S) to a content of phosphorus (P) is 2.40 or higher and 2.49 or lower. In the diphosphorus pentasulfide composition for a sulfide-based inorganic solid electrolyte material, in a DSC curve of the diphosphorus pentasulfide composition obtained by measurement using a differential scanning calorimeter under conditions of a start temperature of 25° C., a measured temperature range of 30° C. to 350° C., a temperature (Continued)

increase rate of 5° C./min, and an argon atmosphere with a flow rate of 100 ml per minute, an endothermic peak is shown in a temperature range of 280° C. or higher and 300° C. or lower, and a half-width of the endothermic peak is 4.1° C. or higher.

14 Claims, 5 Drawing Sheets

(56) References Cited

U.S. PATENT DOCUMENTS

| | | | |
|---|---|---|---|
| 9,929,433 B2 | 3/2018 | Kanno et al. | |
| 10,461,363 B2 | 10/2019 | Kanno et al. | |
| 10,644,348 B2* | 5/2020 | Higuchi | H01M 10/0562 |
| 10,811,725 B2 | 10/2020 | Iwasaki et al. | |
| 11,108,084 B2* | 8/2021 | Takahashi | H01M 10/0562 |
| 11,276,881 B2* | 3/2022 | Terai | H01B 1/10 |
| 2007/0248888 A1 | 10/2007 | Seino et al. | |
| 2014/0302382 A1 | 10/2014 | Kambara et al. | |
| 2015/0357673 A1 | 12/2015 | Kanno et al. | |
| 2017/0155168 A1 | 6/2017 | Kanno et al. | |
| 2017/0194662 A1 | 7/2017 | Kambara et al. | |
| 2018/0166740 A1 | 6/2018 | Iwasaki et al. | |
| 2021/0075056 A1 | 3/2021 | Nakata et al. | |
| 2024/0154155 A1* | 5/2024 | Nakayama | H01M 10/0562 |

FOREIGN PATENT DOCUMENTS

| | | | | |
|---|---|---|---|---|
| CN | 115552553 A * | 12/2022 | | C01B 25/14 |
| EP | 3026749 A1 | 6/2016 | | |
| EP | 3214054 A1 | 9/2017 | | |
| JP | 2008-021424 A | 1/2008 | | |
| JP | 2016-27545 A | 2/2016 | | |
| JP | 2018-49732 A | 3/2018 | | |
| JP | 2018-049834 A | 3/2018 | | |
| JP | 2018-97954 A | 6/2018 | | |
| JP | 2020-61302 A | 4/2020 | | |
| KR | 20130042580 A * | 4/2013 | | |
| TW | 202140373 A * | 11/2021 | | C01B 25/14 |
| WO | 2018/225526 A1 | 12/2018 | | |
| WO | WO-2019098245 A1 * | 5/2019 | | C03B 19/12 |
| WO | WO-2022190940 A1 * | 9/2022 | | H01B 1/06 |
| WO | WO-2022210675 A1 * | 10/2022 | | |

OTHER PUBLICATIONS

Wang et al, Phosphorous Pentasulfide as a Novel Additive for HighPerformance Lithium-Sulfur Batteries, Journal of the American Chemical Society, 145, 188865-188876, 2023. (Year: 2023).*
Yen et al, Phosphorous Pentasulfi de as a Novel Additive for HighPerformance Lithium-Sulfur Batteries, Applied Materials and Interfaces, 13, 58712-58722, 2021. (Year: 2021).*
English translation of the written opinion (no date) (Year: 0000).*
Office Action dated Feb. 14, 2023, issued in counterpart JP Application No. 2019-066562, with English Translation. (3 pages).
Office Action dated Feb. 14, 2023, issued in counterpart JP Application No. 2019-066563, with English Translation. (3 pages).
Extended European Search Report dated Jan. 4, 2023, issued in counterpart EP Application No. 20785253.4. (7 pages).
International Search Report (ISR) dated Jun. 2, 2020 filed in PCT/JP2020/009705.
Office Action dated Nov. 30, 2023, issued in counterpart CN application No. 202080024479.6, with English translation. (16 pages).
Tento, "The production of musical fruit", Combustion Chemical Industry Press, Oct. 1971, pp. 63 and 66, cited in CN Office Action dated Nov. 30, 2023. (3 pages).

* cited by examiner and negative electrode active material layer, the electrolyte layer, and the negative

DIPHOSPHORUS PENTASULFIDE COMPOSITION FOR SULFIDE-BASED INORGANIC SOLID ELECTROLYTE MATERIAL

TECHNICAL FIELD

The present invention relates to a diphosphorus pentasulfide composition for a sulfide-based inorganic solid electrolyte material.

BACKGROUND ART

In general, a lithium ion battery is used as a power supply of a small mobile device such as a mobile phone or a laptop. In addition, recently, the lithium ion battery has been used not only as a power supply of a small mobile device but also as a power supply of an electric vehicle, an electric power storage, or the like.

In a currently available lithium ion battery, an electrolytic solution including a combustible organic solvent is used. On the other hand, in a lithium ion battery (hereinafter, also referred to as "all-solid-state lithium ion battery") in which a solid electrolyte is replaced with the electrolytic solution such that the entire battery is made of a solid, a combustible organic solvent is not used in the battery. Therefore, it is considered that a safety device can be simplified and manufacturing costs or productivity is excellent.

As a solid electrolyte material used for the solid electrolyte, for example, a sulfide-based inorganic solid electrolyte material is known.

Patent Document 1 (Japanese Unexamined Patent Publication No. 2016-27545) describes a sulfide-based solid electrolyte material having a peak at a position of $2\theta = 29.86° \pm 1.00°$ in X-ray diffraction measurement using a CuKα ray and a composition of $Li_{2y+3}PS_4$ ($0.1 \leq y \leq 0.175$).

RELATED DOCUMENT

Patent Document

[Patent Document 1] Japanese Unexamined Patent Publication No. 2016-27545

SUMMARY OF THE INVENTION

Technical Problem

The sulfide-based inorganic solid electrolyte material has excellent electrochemical stability and lithium ionic conductivity, but the lithium ionic conductivity is lower than that of an electrolytic solution.

Therefore, for the sulfide-based inorganic solid electrolyte material used for a lithium ion battery, further improvement of lithium ionic conductivity is required while maintaining electrochemical stability.

The present invention has been made in consideration of the above-described circumstances, and an object thereof is to provide a diphosphorus pentasulfide composition with which the lithium ionic conductivity of the obtained sulfide-based inorganic solid electrolyte material can be improved.

Solution to Problem

The present inventors conducted a thorough investigation in order to provide a sulfide-based inorganic solid electrolyte material with improved lithium ionic conductivity. As a result, the present inventors found that the lithium ionic conductivity of the obtained sulfide-based inorganic solid electrolyte material can be improved by using, as a raw material for manufacturing a sulfide-based inorganic solid electrolyte material, a diphosphorus pentasulfide composition in which a molar ratio (S/P) of a content of sulfur (S) to a content of phosphorus (P) is in a specific range or a diphosphorus pentasulfide composition in which, in a DSC curve, an endothermic peak is observed in a temperature range of 280° C. or higher and 300° C. or lower and a half-width of the endothermic peak is a specific temperature or higher, thereby completing the present invention.

That is, according to the present invention, there is provided a diphosphorus pentasulfide composition for a sulfide-based inorganic solid electrolyte material, in which a molar ratio (S/P) of a content of sulfur (S) to a content of phosphorus (P) is 2.40 or higher and 2.49 or lower.

In addition, according to the present invention, there is provided a diphosphorus pentasulfide composition for a sulfide-based inorganic solid electrolyte material, in which in a DSC curve of the diphosphorus pentasulfide composition obtained by measurement using a differential scanning calorimeter under conditions of a start temperature of 25° C., a measured temperature range of 30° C. to 350° C., a temperature increase rate of 5° C./min, and an argon atmosphere with a flow rate of 100 ml per minute, an endothermic peak is shown in a temperature range of 280° C. or higher and 300° C. or lower, and a half-width of the endothermic peak is 4.1° C. or higher.

In addition, according to the present invention, there is provided a raw material composition of a sulfide-based inorganic solid electrolyte material, the raw material composition including: the above-described diphosphorus pentasulfide composition; and lithium sulfide.

Further, according to the present invention, there is provided a method of manufacturing a sulfide-based inorganic solid electrolyte material, the method including a step of mechanically processing the above-described raw material composition of the sulfide-based inorganic solid electrolyte material.

Further, according to the present invention, there is provided a sulfide-based inorganic solid electrolyte material that is obtained by using the above-described diphosphorus pentasulfide composition as a raw material.

Further, according to the present invention, there is provided a solid electrolyte including the above-described sulfide-based inorganic solid electrolyte material.

Further, according to the present invention, there is provided a solid electrolyte membrane including the above-described solid electrolyte as a main component.

Further, according to the present invention, there is provided a lithium ion battery including: a positive electrode including a positive electrode active material layer; an electrolyte layer; and a negative electrode including a negative electrode active material layer, in which at least one of the positive electrode active material layer, the electrolyte layer, and the negative electrode active material layer includes the above-described sulfide-based inorganic solid electrolyte material.

Advantageous Effects of Invention

According to the present invention, it is possible to provide a diphosphorus pentasulfide composition with which the lithium ionic conductivity of the obtained sulfide-based inorganic solid electrolyte material can be improved.

DESCRIPTION OF EMBODIMENTS

Figure 1:
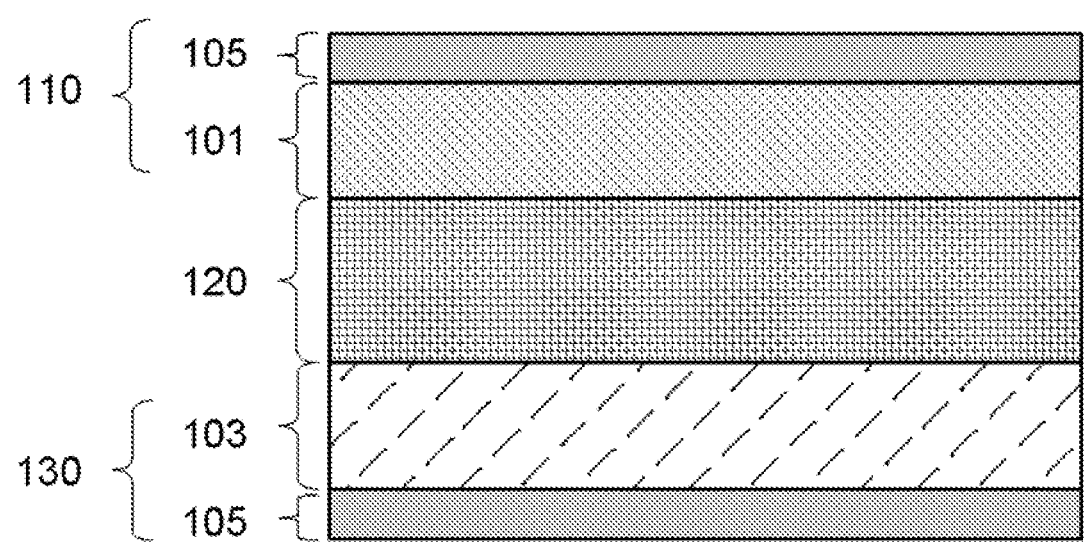
FIG. 1 is a cross-sectional view showing a structure of a lithium ion battery according to an embodiment of the present invention.

Hereinafter, an embodiment of the present invention will be described using the drawings. In all the drawings, the same components are represented by common reference numerals, and the description thereof will not be repeated. In addition, the diagrams are schematic diagrams, in which a dimensional ratio does not match the actual one. Unless specified otherwise, a numerical range "A to B" represents A or more and B or less.

First Embodiment

<Diphosphorus Pentasulfide Composition>

First, a diphosphorus pentasulfide composition according to a first embodiment will be described.

The diphosphorus pentasulfide composition according to the first embodiment is a diphosphorus pentasulfide composition for a sulfide-based inorganic solid electrolyte material (hereinafter, also referred to as "diphosphorus pentasulfide composition"), in which a molar ratio (S/P) of a content of sulfur (S) to a content of phosphorus (P) is 2.40 or higher and 2.49 or lower.

From the viewpoint of further improving the stability over time of the obtained sulfide-based inorganic solid electrolyte material, the lower limit of S/P is preferably 2.41 or higher, more preferably 2.42 or higher, and still more preferably 2.43 or higher.

In the diphosphorus pentasulfide composition according to the first embodiment, by adjusting S/P to be in the above-described range, the lithium ionic conductivity of the obtained sulfide-based inorganic solid electrolyte material can be improved.

In the first embodiment, the diphosphorus pentasulfide composition in which S/P is in the above-described range can be obtained, for example, by heating a raw material composition of diphosphorus pentasulfide in a vacuum such that the content of the sulfur component in the diphosphorus pentasulfide composition decreases.

In a DSC curve of the diphosphorus pentasulfide composition according to the first embodiment obtained by measurement using a differential scanning calorimeter under conditions of a start temperature of 25° C., a measured temperature range of 30° C. to 350° C., a temperature increase rate of 5° C./min, and an argon atmosphere with a flow rate of 100 ml per minute, an endothermic peak is shown in a temperature range of 280° C. or higher and 300° C. or lower, and the lower limit of a half-width of the endothermic peak is preferably 4.1° C. or higher, more preferably 4.3° C. or higher, still more preferably 4.5° C. or higher, and still more preferably 4.7° C. or higher. As a result, the lithium ionic conductivity and the stability over time of the obtained sulfide-based inorganic solid electrolyte material can be further improved.

The upper limit of the half-width of the endothermic peak is not particularly limited and is, for example, 7.0° C. or lower and preferably 6.8° C. or lower.

Here, the endothermic peak observed in the temperature range of 280° C. or higher and 300° C. or lower is a melting point of diphosphorus pentasulfide ($P_2S_5$).

In the first embodiment, the diphosphorus pentasulfide composition in which the half-width of the endothermic peak in the DSC curve is in the above-described range can be obtained, for example, by performing a process of heating a raw material composition of diphosphorus pentasulfide in a vacuum such that the content of a phosphorus sulfide compound (for example, $P_4S_3$ or $P_6S_5O_{10}$) or a phosphorus sulfide polymer having a low boiling point in the diphosphorus pentasulfide composition decreases.

In addition, a heat of fusion of the endothermic peak is preferably 70 J/g or more, more preferably 80 J/g or more, still more preferably 85 J/g or more, still more preferably 90 J/g or more, and still more preferably 95 J/g or more. The upper limit of the heat of fusion of the endothermic peak is not particularly limited and is, for example, 150 J/g or less and may be 130 J/g or less, 120 J/g or less, or 110 J/g or less.

In the first embodiment, the diphosphorus pentasulfide composition in which the heat of fusion of the endothermic peak in the DSC curve is in the above-described range can be obtained, for example, by performing a process of heating a raw material composition of diphosphorus pentasulfide in a vacuum such that the content of a phosphorus sulfide compound (for example, $P_4S_3$ or $P_6S_5O_{10}$) or a phosphorus sulfide polymer having a low boiling point in the diphosphorus pentasulfide composition decreases.

The lower limit of the melting point of the diphosphorus pentasulfide composition according to the first embodiment measured using a differential scanning calorimeter is preferably 291° C. or higher. As a result, the lithium ionic conductivity and the stability over time of the obtained sulfide-based inorganic solid electrolyte material can be further improved.

The upper limit of the melting point of the diphosphorus pentasulfide composition according to the first embodiment is not particularly limited and is, for example, 300° C. or lower, preferably 298° C. or lower, and more preferably 295° C. or lower.

In the first embodiment, the diphosphorus pentasulfide composition in which the melting point in the DSC curve is in the above-described range can be obtained, for example, by heating a raw material composition of diphosphorus pentasulfide in a vacuum such that the content of a phosphorus sulfide compound (for example, $P_4S_3$ or $P_6S_5O_{10}$) or a phosphorus sulfide polymer having a low boiling point in the diphosphorus pentasulfide composition decreases.

The above-described DSC curve can be measured using, for example, the following method.

First, in an argon atmosphere, 20 to 25 mg of the diphosphorus pentasulfide composition is weighed in an aluminum pan. Next, the aluminum pan is covered with an aluminum lid and sealed with a sample sealer. An aluminum container as a reference is empty. Differential scanning calorimetry is performed using a differential scanning calorimeter under conditions of a start temperature of 25° C., a measured temperature range of 30° C. to 350° C., a temperature increase rate of 5° C./min, and an argon atmosphere with a flow rate of 100 ml per minute. In addition, as the differential scanning calorimeter, for example, DSC6300 (manufactured by Seiko Instruments Inc.) can be used without any particular limitation.

In addition, when the diphosphorus pentasulfide composition includes a solvent, it is preferable that the measurement is performed after drying and removing the solvent from the diphosphorus pentasulfide composition.

Whether or not the endothermic peak is present in the temperature range of 280° C. or higher and 300° C. or lower can be observed from the DSC curve obtained as described above.

Here, the heat of fusion of the above-described endothermic peak can be calculated by obtaining the area of a region surrounded by a melting endothermic curve including an endothermic peak and a baseline. Since the heat capacity inherent to a material varies before and after a thermal change, baselines before and after the endothermic peak are not straight.

Figure 2:
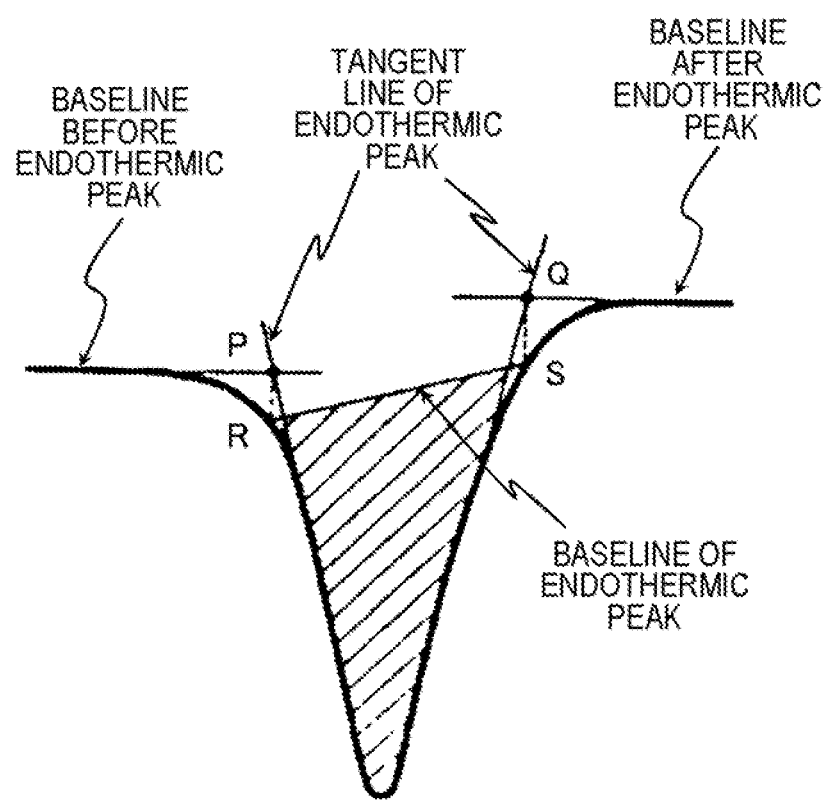
FIG. 2 is a diagram showing a baseline used when a heat quantity of an endothermic peak is calculated.

Therefore, in the first embodiment, the baseline in the endothermic peak is a line obtained by connecting a point R and a point S in FIG. 2 to each other. The point R is an intersection point between a line that passes through an intersection point P and is parallel to the Y-axis and the melting endothermic curve, the intersection point P being an intersection point of the baseline before the endothermic peak and a tangent line of the endothermic peak. The point S is an intersection point between a line that passes through an intersection point Q and is parallel to the Y-axis and the melting endothermic curve, the intersection point Q being an intersection point of the baseline after the endothermic peak and a tangent line of the endothermic peak.

In addition, in the diphosphorus pentasulfide composition according to the first embodiment, the endothermic peak observed in the temperature range of 280° C. or higher and 300° C. or lower is typically one.

The diphosphorus pentasulfide composition according to the first embodiment includes diphosphorus pentasulfide ($P_2S_5$) as a main component. From the viewpoint that the lithium ionic conductivity of the obtained sulfide-based inorganic solid electrolyte material can be further improved, the content of diphosphorus pentasulfide in the diphosphorus pentasulfide composition according to the first embodiment is preferably 95 mass % or higher, more preferably 97 mass % or higher, still more preferably 98 mass % or higher, and still more preferably 99 mass % or higher. The upper limit of the content of diphosphorus pentasulfide in the diphosphorus pentasulfide composition according to the first embodiment is not particularly limited and is, for example, 100 mass % or lower. Examples of a component in the diphosphorus pentasulfide composition according to the first embodiment other than diphosphorus pentasulfide ($P_2S_5$) include $P_4S_3$ and $P_6S_5O_{10}$.

Examples of properties of the diphosphorus pentasulfide composition according to the first embodiment include powdery. The sulfide-based inorganic solid electrolyte material described below is generally manufactured through a dry process. Therefore, when the properties of the diphosphorus pentasulfide composition according to the first embodiment are powdery, the sulfide-based inorganic solid electrolyte material is more easily manufactured.

[Method of Manufacturing Diphosphorus Pentasulfide Composition]

Next, a method of manufacturing the diphosphorus pentasulfide composition according to the first embodiment will be described.

The method of manufacturing the diphosphorus pentasulfide composition according to the first embodiment is different from a method of manufacturing a diphosphorus pentasulfide composition in the related art. That is, the diphosphorus pentasulfide composition in which the molar ratio (S/P) of the content of sulfur (S) to the content of phosphorus (P) is in the above-described range can be obtained by adopting the improvement in terms of manufacturing, for example, the process of heating a raw material composition of diphosphorus pentasulfide in a vacuum such that the content of the sulfur component having a low boiling point in the diphosphorus pentasulfide composition decreases.

The method of manufacturing the diphosphorus pentasulfide composition according to the first embodiment can adopt various specific manufacturing conditions on the premise of adopting the above-described improvement in terms of manufacturing.

Hereinafter, the method of manufacturing the diphosphorus pentasulfide composition according to the first embodiment will be described in more detail.

The method of manufacturing the diphosphorus pentasulfide composition according to the first embodiment includes, for example, steps (X) and (Y) described below.

Step (X): a step of preparing a raw material composition of diphosphorus pentasulfide Step (Y): a step of decreasing the molar ratio (S/P) of the content of sulfur (S) to the content of phosphorus (P), for example, by heating the raw material composition of diphosphorus pentasulfide in a vacuum such that the content of the sulfur component having a low boiling point in the diphosphorus pentasulfide composition having a low boiling point in the diphosphorus pentasulfide composition decreases.

First, the raw material composition of diphosphorus pentasulfide is prepared.

The raw material composition of diphosphorus pentasulfide used as the raw material is not particularly limited. A commercially available diphosphorus pentasulfide ($P_2S_5$) may be used as it is, or a raw material composition of diphosphorus pentasulfide obtained using a general well-known method of manufacturing diphosphorus pentasulfide may be used.

Next, by heating the raw material composition of diphosphorus pentasulfide in a vacuum, the content of the sulfur component having a low boiling point in the diphosphorus pentasulfide composition decreases. Here, the raw material composition of diphosphorus pentasulfide is heated in a vacuum until S/P is 2.40 or higher 2.49 or lower. As a result, the diphosphorus pentasulfide composition according to the first embodiment can be obtained. Here, for example, when the raw material composition of diphosphorus pentasulfide is heated in a vacuum, a component accumulated in the bottom of the container without being evaporated is the diphosphorus pentasulfide composition according to the first embodiment.

Conditions, for example, a pressure, a heating temperature, or a processing time during the heating of raw material composition of diphosphorus pentasulfide in a vacuum can be appropriately determined depending on the amount of the raw material composition of diphosphorus pentasulfide processed.

The internal pressure of a vacuum heating device when the raw material composition of diphosphorus pentasulfide is heated in a vacuum is, for example, −0.01 MPa or lower and preferably −0.07 MPa or lower.

The heating temperature when the raw material composition of diphosphorus pentasulfide is heated in a vacuum is, for example, 220° C. or higher and 500° C. or lower and preferably 250° C. or higher and 350° C. or lower.

The time for which the raw material composition of diphosphorus pentasulfide is heated in a vacuum is, for example, 0.5 hours or longer and 24 hours or shorter and preferably 1 hour or longer and 5 hours or shorter.

Second Embodiment

<Diphosphorus Pentasulfide Composition>

First, a diphosphorus pentasulfide composition according to a second embodiment will be described.

The diphosphorus pentasulfide composition according to the second embodiment is a diphosphorus pentasulfide composition for a sulfide-based inorganic solid electrolyte material (hereinafter, also referred to as "diphosphorus pentasulfide composition"). In a DSC curve of the diphosphorus pentasulfide composition according to the second embodiment obtained by measurement using a differential scanning calorimeter under conditions of a start temperature of 25° C., a measured temperature range of 30° C. to 350° C., a temperature increase rate of 5° C./min, and an argon atmosphere with a flow rate of 100 ml per minute, an endothermic peak is shown in a temperature range of 280° C. or higher and 300° C. or lower, and the lower limit of a half-width of the endothermic peak is 4.1° C. or higher, preferably 4.3° C. or higher, more preferably 4.5° C. or higher, and still more preferably 4.7° C. or higher. As a result, the lithium ionic conductivity and the stability over time of the obtained sulfide-based inorganic solid electrolyte material can be improved.

The upper limit of the half-width of the endothermic peak is not particularly limited and is, for example, 7.0° C. or lower and preferably 6.8° C. or lower.

Here, the endothermic peak observed in the temperature range of 280° C. or higher and 300° C. or lower is a melting point of diphosphorus pentasulfide ($P_2S_5$).

In the diphosphorus pentasulfide composition according to the second embodiment, by adjusting the half-width of the endothermic peak to be the above-described lower limit value or higher, the lithium ionic conductivity of the obtained sulfide-based inorganic solid electrolyte material can be improved.

The reason for this is necessarily clear and but is presumed to be that the content of a phosphorus sulfide compound (for example, $P_4S_3$ or $P_6S_5O_{10}$) having a low boiling point in the diphosphorus pentasulfide composition according to the second embodiment is low.

Accordingly, it is presumed that the half-width of the above-described endothermic peak measured using the above-described method is an index representing the content of a phosphorus sulfide compound (for example, $P_4S_3$ or $P_6S_5O_{10}$) or a phosphorus sulfide polymer having a low boiling point in the diphosphorus pentasulfide composition. That is, it is presumed that, as the half-width of the endothermic peak increases, the crystallinity of diphosphorus pentasulfide increases, and the content of the phosphorus sulfide compound (for example, $P_4S_3$ or $P_6S_5O_{10}$) or the phosphorus sulfide polymer having a low boiling point decreases.

Due to the above-described reason, in the diphosphorus pentasulfide composition according to the second embodiment, the content of the phosphorus sulfide compound or the phosphorus sulfide polymer having a low boiling point is low. Therefore, it is presumed that, when the diphosphorus pentasulfide composition according to the second embodiment is used, the lithium ionic conductivity of the obtained sulfide-based inorganic solid electrolyte material can be improved.

In the second embodiment, the diphosphorus pentasulfide composition in which the half-width of the endothermic peak in the DSC curve is the above-described lower limit value or higher can be obtained, for example, by performing a process of heating a raw material composition of diphosphorus pentasulfide in a vacuum such that the content of a phosphorus sulfide compound (for example, $P_4S_3$ or $P_6S_5O_{10}$) or a phosphorus sulfide polymer having a low boiling point in the diphosphorus pentasulfide composition decreases.

In addition, a heat of fusion of the endothermic peak is preferably 70 J/g or more, more preferably 80 J/g or more, still more preferably 85 J/g or more, still more preferably 90 J/g or more, and still more preferably 95 J/g or more. The upper limit of the heat of fusion of the endothermic peak is not particularly limited and is, for example, 150 J/g or less and may be 130 J/g or less, 120 J/g or less, or 110 J/g or less.

In the second embodiment, the diphosphorus pentasulfide composition in which the heat of fusion of the endothermic peak in the DSC curve is in the above-described range can be obtained, for example, by performing a process of heating a raw material composition of diphosphorus pentasulfide in a vacuum such that the content of a phosphorus sulfide compound (for example, $P_4S_3$ or $P_6S_5O_{10}$) or a phosphorus sulfide polymer having a low boiling point in the diphosphorus pentasulfide composition decreases.

The lower limit of the melting point of the diphosphorus pentasulfide composition according to the second embodiment measured using a differential scanning calorimeter is preferably 285° C. or higher, more preferably 290° C. or higher, and still more preferably 291° C. or higher. As a result, the lithium ionic conductivity and the stability over time of the obtained sulfide-based inorganic solid electrolyte material can be further improved.

The upper limit of the melting point of the diphosphorus pentasulfide composition according to the second embodiment is not particularly limited and is, for example, 300° C. or lower, preferably 298° C. or lower, and more preferably 295° C. or lower.

In the second embodiment, the diphosphorus pentasulfide composition in which the melting point in the DSC curve is in the above-described range can be obtained, for example, by heating a raw material composition of diphosphorus pentasulfide in a vacuum such that the content of a phosphorus sulfide compound (for example, $P_4S_3$ or $P_6S_5O_{10}$) or a phosphorus sulfide polymer having a low boiling point in the diphosphorus pentasulfide composition decreases.

The above-described DSC curve can be measured using, for example, the following method.

First, in an argon atmosphere, 20 to 25 mg of the diphosphorus pentasulfide composition is weighed in an aluminum pan. Next, the aluminum pan is covered with an aluminum lid and sealed with a sample sealer. An aluminum container as a reference is empty. Differential scanning calorimetry is performed using a differential scanning calorimeter under conditions of a start temperature of 25° C., a measured temperature range of 30° C. to 350° C., a temperature increase rate of 5° C./min, and an argon atmosphere with a flow rate of 100 ml per minute. In addition, as the differential scanning calorimeter, for example, DSC6300 (manufactured by Seiko Instruments Inc.) can be used without any particular limitation.

In addition, when the diphosphorus pentasulfide composition includes a solvent, it is preferable that the measurement is performed after drying and removing the solvent from the diphosphorus pentasulfide composition.

Whether or not the endothermic peak is present in the temperature range of 280° C. or higher and 300° C. or lower can be observed from the DSC curve obtained as described above.

Here, the heat of fusion of the above-described endothermic peak can be calculated by obtaining the area of a region surrounded by a melting endothermic curve including an endothermic peak and a baseline. Since the heat capacity inherent to a material varies before and after a thermal change, baselines before and after the endothermic peak are not straight.

Therefore, in the second embodiment, the baseline in the endothermic peak is a line obtained by connecting a point R and a point S in FIG. 2 to each other. The point R is an intersection point between a line that passes through an intersection point P and is parallel to the Y-axis and the melting endothermic curve, the intersection point P being an intersection point of the baseline before the endothermic peak and a tangent line of the endothermic peak. The point S is an intersection point between a line that passes through an intersection point Q and is parallel to the Y-axis and the melting endothermic curve, the intersection point Q being an intersection point of the baseline after the endothermic peak and a tangent line of the endothermic peak.

In addition, in the diphosphorus pentasulfide composition according to the second embodiment, the endothermic peak observed in the temperature range of 280° C. or higher and 300° C. or lower is typically one.

The diphosphorus pentasulfide composition according to the second embodiment includes diphosphorus pentasulfide ($P_2S_5$) as a main component. From the viewpoint that the lithium ionic conductivity of the obtained sulfide-based inorganic solid electrolyte material can be further improved, the content of diphosphorus pentasulfide in the diphosphorus pentasulfide composition according to the second embodiment is preferably 95 mass % or higher, more preferably 97 mass % or higher, still more preferably 98 mass % or higher, and still more preferably 99 mass % or higher. The upper limit of the content of diphosphorus pentasulfide in the diphosphorus pentasulfide composition according to the second embodiment is not particularly limited and is, for example, 100 mass % or lower. Examples of a component in the diphosphorus pentasulfide composition according to the second embodiment other than diphosphorus pentasulfide ($P_2S_5$) include $P_4S_3$ and $P_6S_5O_{10}$.

Examples of properties of the diphosphorus pentasulfide composition according to the second embodiment include powdery. The sulfide-based inorganic solid electrolyte material described below is generally manufactured through a dry process. Therefore, when the properties of the diphosphorus pentasulfide composition according to the second embodiment are powdery, the sulfide-based inorganic solid electrolyte material is more easily manufactured.

[Method of Manufacturing Diphosphorus Pentasulfide Composition]

Next, a method of manufacturing the diphosphorus pentasulfide composition according to the second embodiment will be described.

The method of manufacturing the diphosphorus pentasulfide composition according to the second embodiment is different from a method of manufacturing a diphosphorus pentasulfide composition in the related art. That is, the diphosphorus pentasulfide composition in which the half-width of the endothermic peak is in the above-described range can be obtained by adopting the improvement in terms of manufacturing, for example, the process of heating a raw material composition of diphosphorus pentasulfide in a vacuum such that the content of the phosphorus sulfide compound (for example, $P_4S_3$ or $P_6S_5O_{10}$) or the phosphorus sulfide polymer having a low boiling point in the diphosphorus pentasulfide composition decreases.

The method of manufacturing the diphosphorus pentasulfide composition according to the second embodiment can adopt various specific manufacturing conditions on the premise of adopting the above-described improvement in terms of manufacturing.

Hereinafter, the method of manufacturing the diphosphorus pentasulfide composition according to the second embodiment will be described in more detail.

The method of manufacturing the diphosphorus pentasulfide composition according to the second embodiment includes, for example, steps (X) and (Y) described below.

Step (X): a step of preparing a raw material composition of diphosphorus pentasulfide Step (Y): a step of decreasing the content of the phosphorus sulfide compound (for example, $P_4S_3$ or $P_5S_5O_{10}$) having a low boiling point in the diphosphorus pentasulfide composition by heating the raw material composition of diphosphorus pentasulfide in a vacuum First, the raw material composition of diphosphorus pentasulfide is prepared.

The raw material composition of diphosphorus pentasulfide used as the raw material is not particularly limited. A commercially available diphosphorus pentasulfide ($P_2S_5$) may be used as it is, or a raw material composition of diphosphorus pentasulfide obtained using a general well-known method of manufacturing diphosphorus pentasulfide may be used.

Next, by heating the raw material composition of diphosphorus pentasulfide in a vacuum, the content of the phosphorus sulfide compound (for example, $P_4S_3$ or $P_6S_5O_{10}$) or the phosphorus sulfide polymer having a low boiling point in the diphosphorus pentasulfide composition decreases. Here, the raw material composition of diphosphorus pentasulfide is heated in a vacuum until the half-width of the endothermic peak is the lower limit value or higher. As a result, the diphosphorus pentasulfide composition according to the second embodiment can be obtained. Here, for example, when the raw material composition of diphosphorus pentasulfide is heated in a vacuum, a component accumulated in the bottom of the container without being evaporated is the diphosphorus pentasulfide composition according to the second embodiment.

Conditions, for example, a pressure, a heating temperature, or a processing time during the heating of raw material composition of diphosphorus pentasulfide in a vacuum can be appropriately determined depending on the amount of the raw material composition of diphosphorus pentasulfide processed.

The internal pressure of a vacuum heating device when the raw material composition of diphosphorus pentasulfide is heated in a vacuum is, for example, −0.01 MPa or lower and preferably −0.07 MPa or lower.

The heating temperature when the raw material composition of diphosphorus pentasulfide is heated in a vacuum is, for example, 220° C. or higher and 500° C. or lower and preferably 250° C. or higher and 350° C. or lower.

The time for which the raw material composition of diphosphorus pentasulfide is heated in a vacuum is, for example, 0.5 hours or longer and 24 hours or shorter and preferably 1 hour or longer and 5 hours or shorter.

Description Common to First Embodiment and Second Embodiment

Hereinafter, features common to the diphosphorus pentasulfide composition according to the first embodiment and the diphosphorus pentasulfide composition according to the second embodiment will be described, and the first embodiment and the second embodiment will be collectively referred to as "present embodiment".

[Sulfide-Based Inorganic Solid Electrolyte Material]

Hereinafter, the sulfide-based inorganic solid electrolyte material according to the present embodiment will be described.

The sulfide-based inorganic solid electrolyte material according to the present embodiment can be obtained by using the diphosphorus pentasulfide composition according to the present embodiment as a raw material.

From the viewpoint of further improving the electrochemical stability and the stability and the handling properties in water or air, it is preferable that the sulfide-based inorganic solid electrolyte material according to the present embodiment includes Li, P, and S as constituent elements.

In addition, in the sulfide-based inorganic solid electrolyte material according to the present embodiment, from the viewpoint of further improving the lithium ionic conductivity, the electrochemical stability, and the stability and the handling properties in water or air, a molar ratio Li/P of the content of Li to the content of P is preferably 1.0 or higher and 5.0 or lower, more preferably 2.0 or higher and 4.0 or lower, still more preferably 2.5 or higher and 3.8 or lower, still more preferably 2.8 or higher and 3.6 or lower, still more preferably 3.0 or higher and 3.5 or lower, still more preferably 3.1 or higher and 3.4 or lower, and still more preferably 3.1 or higher and 3.3 or lower, and a molar ratio S/P of the content of S to the content of P is preferably 2.0 or higher and 6.0 or lower, more preferably 3.0 or higher and 5.0 or lower, still more preferably 3.5 or higher and 4.5 or lower, still more preferably 3.8 or higher and 4.2 or lower, still more preferably 3.9 or higher and 4.1 or lower, and still more preferably 4.0.

Here, the contents of Li, P, and S in the sulfide-based inorganic solid electrolyte material according to the present embodiment can be obtained by, for example, ICP Emission Spectroscopy or X-ray analysis.

In the sulfide-based inorganic solid electrolyte material according to the present embodiment, the lithium ionic conductivity measured using an alternating current impedance method under measurement conditions of 27.0° C., an applied voltage of 10 mV, and a measurement frequency range of 0.1 Hz to 7 MHz is preferably $0.5 \times 10^{-3}$ S·cm$^{-1}$ or higher, more preferably $0.6 \times 10^{-3}$ S·cm$^{-1}$ or higher, still more preferably $0.8 \times 10^{-3}$ S·cm$^{-1}$ or higher, and still more preferably $1.0 \times 10^{-3}$ S·cm$^{-1}$ or higher.

When the lithium ionic conductivity of the sulfide-based inorganic solid electrolyte material according to the present embodiment is the above-described lower limit value or higher, a lithium ion battery having further improved battery characteristics can be obtained. Further, by using the above-described sulfide-based inorganic solid electrolyte material, a lithium ion battery having further improved input and output characteristics can be obtained.

Examples of the shape of the sulfide-based inorganic solid electrolyte material according to the present embodiment include a particle shape.

The sulfide-based inorganic solid electrolyte material having a particle shape according to the present embodiment is not particularly limited, and an average particle size $d_{50}$ in a weight average particle size distribution measured using a laser diffraction scattering particle size distribution method is preferably 1 μm or more and 100 μm or less, more preferably 3 μm or more and 80 μm or less, still more preferably 5 μm or more and 60 μm or less.

By adjusting the average particle size $d_{50}$ of the sulfide-based inorganic solid electrolyte material to be in the above-described range, the lithium ionic conductivity can be further improved while maintaining excellent handling properties.

It is preferable that the sulfide-based inorganic solid electrolyte material according to the present embodiment has excellent electrochemical stability. Here, the electrochemical stability refers to a property in which a material is not likely to be oxidized and reduced in a wide voltage range. More specifically, in the sulfide-based inorganic solid electrolyte material according to the present embodiment, a maximum value of an oxidative decomposition current measured under conditions of temperature of 25° C., a sweep voltage range of 0 to 5 V, and a voltage sweep rate of 5 mV/sec is preferably 0.50 μA or lower, more preferably 0.20 μA or lower, still more preferably 0.10 μA or lower, still more preferably 0.05 μA or lower, and still more preferably 0.03 μA or lower.

When the maximum value of the oxidative decomposition current in the sulfide-based inorganic solid electrolyte material is the above-described upper limit value or lower, the oxidative decomposition of the sulfide-based inorganic solid electrolyte material in the lithium ion battery can be suppressed, which is preferable.

The lower limit value of the maximum value of the oxidative decomposition current in the sulfide-based inorganic solid electrolyte material is not particularly limited and is, for example, 0.0001 μA or higher.

The sulfide-based inorganic solid electrolyte material according to the present embodiment can be used for any application where lithium ionic conductivity is required. In particular, it is preferable that the sulfide-based inorganic solid electrolyte material according to the present embodiment is used for a lithium ion battery. More specifically, the sulfide-based inorganic solid electrolyte material according to the present embodiment is used for a positive electrode active material layer, a negative electrode active material layer, an electrolyte layer, or the like in a lithium ion battery. Further, the sulfide-based inorganic solid electrolyte material according to the present embodiment is suitably used for a positive electrode active material layer, a negative electrode active material layer, a solid electrolyte layer, or the like forming an all-solid-state lithium ion battery, and is more suitably used for a solid electrolyte layer forming an all-solid-state lithium ion battery.

Examples of the all-solid-state lithium ion battery to which the sulfide-based inorganic solid electrolyte material according to the present embodiment is applied include an all-solid-state lithium ion battery in which a positive electrode, a solid electrolyte layer, and a negative electrode are stacked in this order.

[Method of Manufacturing Sulfide-Based Inorganic Solid Electrolyte Material]

Next, a method of manufacturing the sulfide-based inorganic solid electrolyte material according to the present embodiment will be described.

The method of manufacturing the sulfide-based inorganic solid electrolyte material according to the present embodiment includes, for example, a step of mechanically processing a raw material composition of the sulfide-based inorganic solid electrolyte material including the diphosphorus pentasulfide composition according to the present embodiment and lithium sulfide.

More specifically, the sulfide-based inorganic solid electrolyte material according to the present embodiment can be obtained using a manufacturing method including steps (A) and (B) described below. In addition, the method of manufacturing the sulfide-based inorganic solid electrolyte material according to the present embodiment optionally further includes steps (C) and (D) described below.

Step (A): a step of preparing a raw material composition of the sulfide-based inorganic solid electrolyte material including the diphosphorus pentasulfide composition according to the present embodiment and lithium sulfide Step (B): a step of obtaining the sulfide-based inorganic solid electrolyte material in the vitreous state by mechanically processing the raw material composition of the sulfide-based inorganic solid electrolyte material such that the diphosphorus pentasulfide composition and the lithium sulfide as raw materials are vitrified in a chemical reaction Step (C): a step of heating the obtained sulfide-based inorganic solid electrolyte material in the vitreous state such that at least a part thereof is crystallized.

Step (D): a step of crushing, classifying, or granulating the obtained sulfide-based inorganic solid electrolyte material (Step (A) of Preparing Raw Material Composition of Sulfide-Based Inorganic Solid Electrolyte Material)

First, a raw material composition of the sulfide-based inorganic solid electrolyte material including the diphosphorus pentasulfide composition according to the present embodiment and lithium sulfide and optionally further including lithium nitride is prepared. Here, a mixing ratio between the respective raw materials in the raw material composition is adjusted such that the obtained sulfide-based inorganic solid electrolyte material has a desired composition ratio.

A method of mixing the respective raw materials is not particularly limited as long as it is a mixing method capable of uniformly mixing the respective raw materials. For example, the raw materials can be mixed using a ball mill, a beads mill, a vibrating mill, an impact crushing device, a mixer (for example, a pug mixer, a ribbon mixer, a tumbler mixer, a drum mixer, or a V-type mixer), a kneader, a twin-screw kneader, an air flow grinder, a crusher, a rotary blade crusher, or the like.

Mixing conditions such as a stirring rate, a processing time, a temperature, a reaction pressure, or a gravitational acceleration applied to the mixture during the mixing of the respective raw materials can be appropriately determined based on the amount of the mixture processed.

The lithium sulfide used as a raw material is not particularly limited, and a commercially available lithium sulfide may be used. For example, lithium sulfide obtained by reaction of lithium hydroxide and hydrogen sulfide may be also be used. From the viewpoint of obtaining the high-purity sulfide-based inorganic solid electrolyte material and suppressing a side reaction, it is preferable that lithium sulfide having little impurities is used.

Here, in the present embodiment, examples of the lithium sulfide include lithium polysulfide.

Lithium nitride may be used as a raw material. Here, nitrogen in the lithium nitride is discharged into the system as $N_2$. Therefore, by using lithium nitride as an inorganic compound that is a raw material, only the Li composition can be increased with respect to the sulfide-based inorganic solid electrolyte material including Li, P, and S as constituent elements.

The lithium nitride according to the present embodiment is not particularly limited, and a commercially available lithium nitride (for example, $Li_3N$) may be used. For example, lithium nitride obtained by reaction of metallic lithium (for example, Li foil) and nitrogen gas may be also be used. From the viewpoint of obtaining the high-purity solid electrolyte material and suppressing a side reaction, it is preferable that lithium nitride having little impurities is used.

(Step (B) of Obtaining Sulfide-Based Inorganic Solid Electrolyte Material in Vitreous State)

Next, the sulfide-based inorganic solid electrolyte material in the vitreous state is obtained by mechanically processing the raw material composition of the sulfide-based inorganic solid electrolyte material such that the diphosphorus pentasulfide composition and the lithium sulfide as raw materials are vitrified in a chemical reaction.

Here, the mechanical process refers to a process of causing two or more kinds of inorganic compounds to mechanically collide with each other to be vitrified in a chemical reaction, for example, a mechanochemical process. Here, the mechanochemical process refers to a method of vitrifying a target composition while applying a mechanical energy such as a shear force or an impact force.

In addition, in the step (B), it is preferable that the mechanochemical process is a dry mechanochemical process from the viewpoint of realizing the process in an environment where water or oxygen is removed at a high level.

By using the mechanochemical process, the respective raw materials can be mixed while crushing the raw materials into fine particles. Therefore, the contact area of the respective raw materials can be increased. As a result, the reaction of the respective raw materials can be accelerated. The sulfide-based inorganic solid electrolyte material according to the present embodiment can be obtained with higher efficiency.

Here, the mechanochemical process refers to a method of vitrifying a mixing target while applying a mechanical energy such as a shear force, an impact force, or a centrifugal force. Examples of a device for vitrification (hereinafter, referred to as "vitrification device") in the mechanochemical process include: a crusher and disperser such as a ball mill, a beads mill, a vibrating mill, a turbo mill, a mechano-fusion, a disc mill, or a roll mill; a rotation and impact crushing device including a mechanism as a combination of rotation (shearing stress) and impact (compressive stress) represented by a rock drill, a vibration drill, or an impact driver; a high-pressure grinding roll; and a vertical mill such as a roller vertical mill or a ball vertical mill. In particular, from the viewpoint of efficiently generating a very high impact energy, a ball mill or a beads mill is preferable, and a ball mill is more preferable. In addition, from the viewpoint of obtaining excellent continuous productivity, for example, a roll mill; a rotation and impact crushing device including a mechanism as a combination of rotation (shearing stress) and impact (compressive stress) represented by a rock drill, a vibration drill, or an impact driver; a high-pressure grinding roll; or a vertical mill such as a roller vertical mill or a ball vertical mill is preferable.

Mixing conditions such as a rotation speed, a processing time, a temperature, a reaction pressure, or a gravitational acceleration applied to the raw material inorganic composition during the mechanical process of the raw material composition of the sulfide-based inorganic solid electrolyte material can be appropriately determined based on the kind of the raw material inorganic composition or the amount thereof processed. In general, as the rotation speed increases, the glass production rate increases, and as the processing time increases, the glass conversion rate increases.

Typically, when X-ray diffraction analysis is performed using CuKα rays as a radiation source, if a diffraction peak derived from the raw material is lost or decreases, it can be determined that the raw material composition of the sulfide-based inorganic solid electrolyte material is vitrified and a desired sulfide-based inorganic solid electrolyte material is obtained.

Here, in the step (B), it is preferable that the vitrification process is performed until the lithium ionic conductivity of the sulfide-based inorganic solid electrolyte material measured using an alternating current impedance method under measurement conditions of 27.0° C., an applied voltage of 10 mV, and a measurement frequency range of 0.1 Hz to 7 MHz is preferably $1.0 \times 10^{-4}$ S·cm$^{-1}$ or higher, more preferably $2.0 \times 10^{-4}$ S·cm$^{-1}$ or higher, still more preferably $3.0 \times 10^{-4}$ S·cm$^{-1}$ or higher, and still more preferably $4.0 \times 10^{-4}$ S·cm$^{-1}$ or higher. As a result, a sulfide-based inorganic solid electrolyte material having further improved lithium ionic conductivity can be obtained.

(Step (C) of Crystallizing at Least Part of Sulfide-Based Inorganic Solid Electrolyte Material)

Next, the sulfide-based inorganic solid electrolyte material in the glass ceramic state (also referred to as "crystallized glass") is formed by heating the obtained sulfide-based inorganic solid electrolyte material in the vitreous state such that at least a part of the sulfide-based inorganic solid electrolyte material is crystallized. As a result, a sulfide-based inorganic solid electrolyte material having further improved lithium ionic conductivity can be obtained.

That is, from the viewpoint of obtaining excellent lithium ionic conductivity, it is preferable that the sulfide-based inorganic solid electrolyte material according to the present embodiment is in the glass ceramic state (crystallized glass state).

The temperature at which the sulfide-based inorganic solid electrolyte material in the vitreous state is heated is preferably in a range of 220° C. or higher and 500° C. or lower and more preferably in a range of 250° C. or higher and 350° C. or lower.

The time for which the sulfide-based inorganic solid electrolyte material in the vitreous state is heated is not particularly limited as long as it is the time for which the desired sulfide-based inorganic solid electrolyte material in the glass ceramic state can be obtained. For example, the time is in a range of 0.5 hours or longer and 24 hours or shorter and preferably 1 hour or longer and 3 hours or shorter. A heating method is not particularly limited, and examples thereof include a method using a calcination furnace. Conditions such as a temperature or a time during heating can be appropriately adjusted in order to optimize properties of the sulfide-based inorganic solid electrolyte material according to the present embodiment.

In addition, it is preferable that the sulfide-based inorganic solid electrolyte material in the vitreous state is heated, for example, in an inert gas atmosphere. As a result, deterioration (for example, oxidation) of the sulfide-based inorganic solid electrolyte material can be prevented.

Examples of the inert gas when the sulfide-based inorganic solid electrolyte material in the vitreous state is heated include argon gas, helium gas, and nitrogen gas. In order to prevent impurities from being mixed in a product, it is preferable that the purity of the inert gas is as high as possible. In addition, in order to avoid contact with water, the dew point is preferably −70° C. or lower and more preferably −80° C. or lower. A method of introducing the inert gas into the mixed system is not particularly limited as long as it is a method capable of filling the mixed system with the inert gas atmosphere. Examples of the introduction method include a method of purging inert gas and a method continuously introducing inert gas at a given flow rate.

(Step (D) of Crushing, Classifying, or Granulating)

In the method of manufacturing the sulfide-based inorganic solid electrolyte material according to the present embodiment, optionally, the step of crushing, classifying, or granulating the obtained sulfide-based inorganic solid electrolyte material may be further performed. For example, by crushing the sulfide-based inorganic solid electrolyte material into fine particles and adjusting the particle size thereof through a classification operation or a granulation operation, a sulfide-based inorganic solid electrolyte material having a desired particle size can be obtained. The above-described crushing method is not particularly limited, and a well-known crushing method such as a mixer, air flow grinding, a mortar, a tumbling mill, or a coffee mill can be used. In addition, the above-described classification method is not particularly limited, and a well-known method such as a sieve can be used.

From the viewpoint of avoiding contact with water in air, it is preferable that crushing or classification is performed in an inert gas atmosphere or a vacuum atmosphere.

In order to obtain the sulfide-based inorganic solid electrolyte material according to the present embodiment, it is important to appropriately adjust the respective steps. The method of manufacturing the sulfide-based inorganic solid electrolyte material according to the present embodiment is not limited to the above-described method. By appropriately adjusting various conditions, the sulfide-based inorganic solid electrolyte material according to the present embodiment can be obtained.

[Solid Electrolyte]

Next, a solid electrolyte according to the present embodiment will be described. The solid electrolyte according to the present embodiment includes the sulfide-based inorganic solid electrolyte material according to the present embodiment.

The solid electrolyte according to the present embodiment is not particularly limited, and components other than the sulfide-based inorganic solid electrolyte material according to the present embodiment may include various solid electrolyte materials other than the sulfide-based inorganic solid electrolyte material according to the present embodiment within a range where the object of the present invention does not deteriorate.

The solid electrolyte according to the present embodiment may include various solid electrolyte materials other than the sulfide-based inorganic solid electrolyte material according to the present embodiment. The solid electrolyte materials other than the sulfide-based inorganic solid electrolyte material according to the present embodiment are not particularly limited as long as they have ionic conductivity and insulating properties. In general, solid electrolyte materials that are used for a lithium ion battery can be used. Examples of the solid electrolyte materials include: an inorganic solid electrolyte material such as a sulfide-based inorganic solid electrolyte material other than the sulfide-based inorganic solid electrolyte material according to the present embodiment, an oxide-based inorganic solid electrolyte material, or other lithium-based inorganic solid electrolyte materials; and an organic solid electrolyte material such as a polymer electrolyte.

Examples of the sulfide-based inorganic solid electrolyte material other than the sulfide-based inorganic solid electrolyte material according to the present embodiment include a $Li_2S$—$P_2S_5$ material, a $Li_2S$—$SiS_2$ material, a $Li_2S$—$GeS_2$ material, a $Li_2S$—$Al_2S_3$ material, a $Li_2S$—$SiS_2$—$Li_3PO_4$ material, a $Li_2S$—$P_2S_5$—$GeS_2$ material, a $Li_2S$—$Li_2O$—$P_2S_5$—$SiS_2$ material, a $Li_2S$—$GeS_2$—$P_2S_5$—$SiS_2$ material, a $Li_2S$—$SnS_2$—$P_2S_5$—$SiS_2$ material, a $Li_2S$—$P_2S_5$—$Li_3N$ material, a $Li_2S_{2+x}$—$P_4S_3$ material, and a $Li_2S$—$P_2S_5$—$P_4S_3$ material. Among these, one kind may be used singly, or two or more kinds may be used in combination.

Among these, the $Li_2S$—$P_2S_5$ material is preferable from the viewpoint that it has excellent lithium ionic conductivity and has stability to the extent that decomposition or the like does not occur in a wide voltage range. Here, for example, the $Li_2S$—$P_2S_5$ material refers to a solid electrolyte material obtained by a chemical reaction caused by mechanically processing an inorganic composition including at least $Li_2S$ (lithium sulfide) and $P_2S_5$.

Here, in the present embodiment, examples of the lithium sulfide include lithium polysulfide.

Examples of the oxide-based inorganic solid electrolyte material include: a NASICON type such as $LiTi_2(PO_4)_3$, $LiZr_2(PO_4)_3$, or $LiGe_2(PO_4)_3$; a perovskite type such as $(La_{0.5+x}Li_{0.5-3x})TiO_3$; a $Li_2O$—$P_2O_5$ material; and a $Li_2O$—$P_2O_5$—$Li_3N$ material.

Examples of the other lithium-based inorganic solid electrolyte material include LiPON, $LiNbO_3$, $LiTaO_3$, $Li_3PO_4$, $LiPO_{4-x}N_x$ (x satisfies $0<x\leq1$), LiN, LiI, and LISICON.

Further, a glass ceramic obtained by precipitating crystal of the inorganic solid electrolyte materials can also be used as the inorganic solid electrolyte material.

As the organic solid electrolyte material, a polymer electrolyte such as a dry polymer electrolyte or a gel electrolyte can be used.

As the polymer electrolyte, in general, those that are used for a lithium ion battery can be used.

[Solid Electrolyte Membrane]

Next, a solid electrolyte membrane according to the present embodiment will be described.

The solid electrolyte membrane according to the embodiment includes a solid electrolyte including the sulfide-based inorganic solid electrolyte material according to the present embodiment as a main component.

The solid electrolyte membrane according to the present embodiment is used, for example, as a solid electrolyte layer forming an all-solid-state lithium ion battery.

Examples of the all-solid-state lithium ion battery to which the solid electrolyte membrane according to the present embodiment is applied include an all-solid-state lithium ion battery in which a positive electrode, a solid electrolyte layer, and a negative electrode are stacked in this order. In this case, the solid electrolyte layer is formed of the solid electrolyte membrane.

The average thickness of the solid electrolyte membrane according to the present embodiment is preferably 5 µm or more and 500 µm or less, more preferably 10 µm or more and 200 µm or less, and still more preferably 20 µm or more and 100 µm or less. When the average thickness of the solid electrolyte membrane is the lower limit value or more, the loss of the solid electrolyte or the cracking of the solid electrolyte membrane surface can be further suppressed. In addition, when the average thickness of the solid electrolyte membrane is the upper limit value or less, the impedance of the solid electrolyte membrane can be further decreased. As a result, the battery characteristics of the obtained all-solid-state lithium ion battery can be further improved.

It is preferable that the solid electrolyte membrane according to the present embodiment is a compact obtained by compression-molding the particle-shaped solid electrolyte including the sulfide-based inorganic solid electrolyte material according to the present embodiment. That is, it is preferable that the particle-shaped solid electrolyte is compression-molded to obtain a solid electrolyte membrane having a given strength due to the anchor effect between the solid electrolyte material particles.

By obtaining the compact, the solid electrolyte particles bind to each other, and the strength of the obtained solid electrolyte membrane can be further improved. As a result, the loss of the solid electrolyte or the cracking of the solid electrolyte membrane surface can be further suppressed.

The content of the sulfide-based inorganic solid electrolyte material according to the present embodiment in the solid electrolyte membrane according to the present embodiment is preferably 50 mass % or higher, more preferably 60 mass % or higher, still more preferably 70 mass % or higher, still more preferably 80 mass % or higher, still more preferably 90 mass % or higher with respect to 100 mass % of the total mass of the solid electrolyte membrane. As a result, the contact between the solid electrolyte particles can be improved, and the interfacial contact resistance of the solid electrolyte membrane can be decreased. As a result, the lithium ionic conductivity of the solid electrolyte membrane can be further improved. By using the solid electrolyte membrane having excellent lithium ionic conductivity, the battery characteristics of the obtained all-solid-state lithium ion battery can be further improved.

The upper limit of the content of the sulfide-based inorganic solid electrolyte material according to the present embodiment in the solid electrolyte membrane according to the present embodiment is not particularly limited and is, for example, 100 mass % or lower.

The planar shape of the solid electrolyte membrane is not particularly limited and can be appropriately selected according to the shape of an electrode or a current collector. For example, the planar shape is rectangular.

In addition, the solid electrolyte membrane according to the present embodiment may include a binder resin. The content of the binder resin is preferably lower than 0.5 mass %, more preferably 0.1 mass % or lower, still more preferably 0.05 mass % or lower, and still more preferably 0.01 mass % or lower with respect to 100 mass % of the total mass of the solid electrolyte membrane. In addition, it is more preferable that the solid electrolyte membrane according to the present embodiment does not substantially include the binder resin, and it is most preferable that the solid electrolyte membrane according to the present embodiment does not include the binder resin.

As a result, the contact between the solid electrolyte particles can be improved, and the interfacial contact resistance of the solid electrolyte membrane can be decreased. As a result, the lithium ionic conductivity of the solid electrolyte membrane can be further improved. By using the solid electrolyte membrane having excellent lithium ionic conductivity, the battery characteristics of the obtained all-solid-state lithium ion battery can be improved.

"Substantially not including the binder resin" represents that the binder resin may be included to the extent that the effect of the present embodiment does not deteriorate. In addition, when an adhesive resin layer is provided between the solid electrolyte layer and the positive electrode or the negative electrode, an adhesive resin derived from the adhesive resin layer present in the vicinity of an interface between the solid electrolyte layer and the adhesive resin layer is excluded from "the binder resin in the solid electrolyte membrane".

In order to bind the inorganic solid electrolyte material particles to each other, the binder resin refers to a binder that is generally used for a lithium ion battery. Examples of the binder resin include polyvinyl alcohol, polyacrylic acid, carboxymethyl cellulose, polytetrafluoroethylene, polyvinylidene fluoride, styrene-butadiene rubber, and polyimide.

The solid electrolyte membrane according to the present embodiment can be obtained, for example, by depositing the particle-shaped solid electrolyte on a cavity surface of a mold or a substrate surface in a film shape and subsequently compress-molding the solid electrolyte deposited in a film shape.

A method of compress-molding the solid electrolyte is not particularly limited. For example, when the particle-shaped solid electrolyte is deposited on a cavity surface of a mold, pressing by a mold and a stamp can be used, and when the particle-shaped solid electrolyte is deposited on a substrate surface, pressing, roll pressing, or flat pressing by a mold and a stamp can be used.

The pressure at which the solid electrolyte is compressed is, for example, 10 MPa or higher or 500 MPa or lower.

In addition, optionally, the inorganic solid electrolyte deposited in a film shape may be compressed and heated. When the solid electrolyte particles are fused and bound to each other by performing the heating and compressing such that the strength of the obtained solid electrolyte membrane can be further improved. As a result, the loss of the solid electrolyte or the cracking of the solid electrolyte membrane surface can be further suppressed.

The temperature at which the solid electrolyte is heated is, for example, 40° C. or higher and 500° C. or lower.

[Lithium Ion Battery]

FIG. 1 is a cross-sectional view showing a structure of a lithium ion battery 100 according to an embodiment of the present invention.

The lithium ion battery 100 according to the present embodiment includes: a positive electrode 110 including a positive electrode active material layer 101; an electrolyte layer 120; and a negative electrode 130 including a negative electrode active material layer 103. At least one of the positive electrode active material layer 101, the negative electrode active material layer 103, and the electrolyte layer 120 includes the sulfide-based inorganic solid electrolyte material according to the present embodiment. In addition, it is preferable that all of the positive electrode active material layer 101, the negative electrode active material layer 103, and the electrolyte layer 120 include the sulfide-based inorganic solid electrolyte material according to the present embodiment. In the present embodiment, unless specified otherwise, a layer including a positive electrode active material will be referred to as "the positive electrode active material layer 101". Optionally, the positive electrode 110 may or may not further include a current collector 105 in addition to the positive electrode active material layer 101. In addition, in the present embodiment, unless specified otherwise, a layer including a negative electrode active material will be referred to as "the negative electrode active material layer 103". Optionally, the negative electrode 130 may or may not further include the current collector 105 in addition to the negative electrode active material layer 103.

The shape of the lithium ion battery 100 according to the present embodiment is not particularly limited and may be a cylindrical shape, a coin shape, a square shape, a film shape, or any other shape.

The lithium ion battery 100 according to the present embodiment is manufactured using a generally well-known method. For example, the lithium ion battery 100 is prepared by forming a laminate including the positive electrode 110, the electrolyte layer 120, and the negative electrode 130 in a cylindrical shape, a coin shape, a square shape, a film shape, or any other shape and optionally filling the laminate with a non-aqueous electrolytic solution.

(Positive Electrode)

The positive electrode 110 is not particularly limited, and a positive electrode that is generally used for a lithium ion battery can be used. The positive electrode 110 is not particularly limited and can be manufactured using a generally well-known method. For example, the positive electrode 110 can be obtained by forming the positive electrode active material layer 101 including the positive electrode active material on a surface of the current collector 105 such as aluminum foil.

The thickness or density of the positive electrode active material layer 101 is appropriately determined depending on the intended use of the battery and can be set based on generally well-known information.

The positive electrode active material layer 101 includes the positive electrode active material.

The positive electrode active material is not particularly limited, and a generally well-known material can be used. For example, a composite oxide such as a lithium cobalt oxide ($LiCoO_2$), a lithium nickel oxide ($LiNiO_2$), a lithium manganese oxide ($LiMn_2O_4$), a solid solution oxide ($Li_2MnO_3$—$LiMO_2$ (M=Co, Ni, or the like)), lithium-manganese-nickel oxide ($LiNi_{1/3}Mn_{1/3}CO_{1/3}O_2$), or an olivine-type lithium phosphate ($LiFePO_4$); a conductive polymer such as polyaniline or polypyrrole; a sulfide-based positive electrode active material such as $Li_2S$, CuS, a Li—Cu—S compound, $TiS_2$, FeS, $MoS_2$, a Li—Mo—S compound, a Li—Ti—S compound, a Li—V—S compound, or a Li—Fe—S compound; or a material including sulfur as an active material such as acetylene black impregnated with sulfur, porous carbon impregnated with sulfur, or mixed powder including sulfur and carbon can be used. Among these positive electrode active materials, one kind may be used singly, or two or more kinds may be used in combination.

Among these, from the viewpoints obtaining higher discharge capacity density and obtaining higher cycle characteristics, a sulfide-based positive electrode active material is preferable, and one kind or two or more kinds selected from a Li—Mo—S compound, a Li—Ti—S compound, and a Li—V—S compound are more preferable.

Here, the Li—Mo—S compound includes Li, Mo, and S as constituent elements and can be typically obtained by a chemical reaction caused by mechanically processing an inorganic composition including molybdenum sulfide and lithium sulfide as raw materials.

In addition, the Li—Ti—S compound includes Li, Ti, and S as constituent elements and can be typically obtained by a chemical reaction caused by mechanically processing an inorganic composition including titanium sulfide and lithium sulfide as raw materials.

The Li—V—S compound includes Li, V, and S as constituent elements and can be typically obtained by a chemical reaction caused by mechanically processing an inorganic composition including vanadium sulfide and lithium sulfide as raw materials.

The positive electrode active material layer 101 is not particularly limited and may include, as components other than the positive electrode active material, for example, one or more materials selected from a binder resin, a thickener, a conductive auxiliary agent, a solid electrolyte material, and the like. Hereinafter, the respective materials will be described.

The positive electrode active material layer 101 may include a binder resin having a function of binding the positive electrode active material particles to each other and binding the positive electrode active material and the current collector 105 to each other.

The binder resin according to the present embodiment is not particularly limited as long as it is a typical binder resin that can be used for a lithium ion battery. Examples of the binder resin include polyvinyl alcohol, polyacrylic acid, carboxymethyl cellulose, polytetrafluoroethylene, polyvinylidene fluoride, styrene-butadiene rubber, and polyimide. Among the binders, one kind may be used singly, or two or more kinds may be used in combination.

From the viewpoint of securing the fluidity of a slurry suitable for application, the positive electrode active material layer 101 may include a thickener. The thickener is not particularly limited as long as it is a typical thickener that can be used for a lithium ion battery. Examples of the thickener include a cellulose polymer such as carboxymethyl cellulose, methyl cellulose, or hydroxypropyl cellulose and an ammonium salt and an alkali metal salt thereof; and a water-soluble polymer such as polycarboxylic acid, polyethylene oxide, polyvinyl pyrrolidone, polyacrylate, or polyvinyl alcohol. Among the thickeners, one kind may be used singly, or two or more kinds may be used in combination.

From the viewpoint of improving the conductivity of the positive electrode 110 the positive electrode active material layer 101 may include a conductive auxiliary agent. The conductive auxiliary agent is not particularly limited as long as it is a typical conductive auxiliary agent that can be used for a lithium ion battery. Examples of the conductive auxiliary agent include a carbon black such as Acetylene black or Ketjen black and a carbon material such as a vapor-grown carbon fiber.

The positive electrode according to the present embodiment may include a solid electrolyte including the sulfide-based inorganic solid electrolyte material according to the present embodiment or may include a solid electrolyte including a solid electrolyte material other than the sulfide-based inorganic solid electrolyte material according to the present embodiment. The solid electrolyte material other than the sulfide-based inorganic solid electrolyte material according to the present embodiment are not particularly limited as long as they have ionic conductivity and insulating properties. In general, a solid electrolyte material that is used for a lithium ion battery can be used. Examples of the solid electrolyte material include: an inorganic solid electrolyte material such as a sulfide-based inorganic solid electrolyte material, an oxide-based inorganic solid electrolyte material, or other lithium-based inorganic solid electrolyte materials; and an organic solid electrolyte material such as a polymer electrolyte. More specifically, the inorganic solid electrolyte material described above regarding the description of the solid electrolyte according to the present embodiment can be used.

The mixing ratio between various materials in the positive electrode active material layer 101 is appropriately determined depending on the intended use of the battery and can be set based on generally well-known information.

(Negative Electrode)

The negative electrode 130 is not particularly limited, and a positive electrode that is generally used for a lithium ion battery can be used. The negative electrode 130 is not particularly limited and can be manufactured using a generally well-known method. For example, the negative electrode 130 can be obtained by forming the negative electrode active material layer 103 including the negative electrode active material on a surface of the current collector 105 such as copper.

The thickness or density of the negative electrode active material layer 103 is appropriately determined depending on the intended use of the battery and can be set based on generally well-known information.

The negative electrode active material layer 103 includes the negative electrode active material.

The negative electrode active material is not particularly limited as long as it is a typical negative electrode active material that can be used for a negative electrode of a lithium ion battery. Examples of the negative electrode active material include: a carbon material such as natural graphite, artificial graphite, resinous coal, carbon fiber, activated charcoal, hard carbon, or soft carbon; a metal material mainly formed of lithium, a lithium alloy, tin, a tin alloy, silicon, a silicon alloy, gallium, a gallium alloy, indium, an indium alloy, aluminum, or an aluminum alloy; a conductive polymer such as polyacene, polyacetylene, or polypyrrole; and a lithium titanium composite oxide (for example, $Li_4Ti_5O_{12}$). Among these negative electrode active materials, one kind may be used singly, or two or more kinds may be used in combination.

The negative electrode active material layer 103 is not particularly limited and may include, as components other than the negative electrode active material, for example, one or more materials selected from a binder resin, a thickener, a conductive auxiliary agent, a solid electrolyte material, and the like. These materials are not particularly limited, and examples thereof are the same as those of the materials used for the positive electrode 110.

The mixing ratio between various materials in the negative electrode active material layer 103 is appropriately determined depending on the intended use of the battery and can be set based on generally well-known information.

(Electrolyte Layer)

Next, the electrolyte layer 120 will be described. The electrolyte layer 120 is a layer formed between the positive electrode active material layer 101 and the negative electrode active material layer 103.

Examples of the electrolyte layer 120 include a separator impregnated with a non-aqueous electrolytic solution and a solid electrolyte layer including a solid electrolyte.

The separator according to the present embodiment is not particularly limited as long as it has a function of electrically insulating the positive electrode 110 and the negative electrode 130 to allow transmission of lithium ions. For example, a porous membrane can be used.

As the porous membrane, a microporous polymer film is suitably used, and examples of a material thereof include polyolefin, polyimide, polyvinylidene fluoride, and polyester. In particular, a porous polyolefin film is preferable, and specific examples thereof include a porous polyethylene film and a porous polypropylene film.

The non-aqueous electrolytic solution is obtained by dissolving an electrolyte in a solvent.

As the electrolyte, any well-known lithium salt can be used, and the electrolyte may be selected depending on the kind of the active material. Examples of the electrolyte include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $CF_3SO_3Li$, $CH_3SO_3Li$, $LiCF_3SO_3$, $LiC_4F_9SO_3$, $Li(CF_3SO_2)_2N$, and a lithium lower aliphatic carboxylate.

The solvent in which the electrolyte is dissolved is not particularly limited as long as it is typically used as a liquid in which the electrolyte is dissolved. Examples of the solvent include: a carbonate such as ethylene carbonate (EC), propylene carbonate (PC), butylene carbonate (BC), dimethyl carbonate (DMC), diethyl carbonate (DEC), methyl ethyl carbonate (MEC), or vinylene carbonate (VC); a lactone such as γ-butyrolactone or γ-valerolactone; an ether such as trimethoxy methane, 1,2-dimethoxyethane, diethyl ether, 2-ethoxy ethane, tetrahydrofuran, or 2-methyl tetrahydrofuran; a sulfoxide such as dimethyl sulfoxide; an oxolane such as 1,3-dioxolane or 4-methyl-1,3-dioxolane; a nitrogen-containing solvent such as acetonitrile, nitromethane, formamide, or dimethylformamide; an organic acid ester such as methyl formate, methyl acetate, ethyl acetate, butyl acetate, methyl propionate, or ethyl propionate; a phosphate triester or a diglyme; a triglyme; a sulfolane such as sulfolane or methyl sulfolane; an oxazolidinone such as 3-methyl-2-oxazolidinone; and a sultone such as 1,3-propanesultone, 1,4-butanesultone, or naphthasultone. Among these, one kind may be used singly, or two or more kinds may be used in combination.

The solid electrolyte layer according to the present embodiment is a layer formed between the positive electrode active material layer 101 and the negative electrode active material layer 103, and is formed of a solid electrolyte including a solid electrolyte material. The solid electrolyte in the solid electrolyte layer is not particularly limited as long as it has lithium ionic conductivity. In the present embodiment, it is preferable that the solid electrolyte includes the sulfide-based inorganic solid electrolyte material according to the present embodiment.

The content of the solid electrolyte in the solid electrolyte layer according to the present embodiment is not particularly limited as long as it has a proportion where desired insulating properties can be obtained. For example, the content of the solid electrolyte is in a range of 10 vol % or higher and 100 vol % or lower and preferably in a range of 50 vol % or higher and 100 vol % or lower. In particular, in the present embodiment, it is preferable that the solid electrolyte layer is formed of only the solid electrolyte including the sulfide-based inorganic solid electrolyte material according to the present embodiment.

In addition, the solid electrolyte layer according to the present embodiment may include a binder resin. By including the binder resin, a flexible solid electrolyte layer can be obtained. Examples of the binder resin include a fluorine-containing binder such as polytetrafluoroethylene or polyvinylidene fluoride. The thickness of the solid electrolyte layer is, for example, in a range of 0.1 μm or more and 1000 μm or less and preferably in a range of 0.1 μm or more and 300 μm or less.

Hereinafter, the embodiment of the present invention has been described. However, the embodiment is merely an example of the present invention, and various configurations other than the above-described configurations can also be adopted.

In addition, the present invention is not limited to the above-described embodiments, and modifications, improvements, and the like within a range where the object of the present invention can be achieved are included in the present invention.

EXAMPLES

Hereinafter, the present invention will be described in more detail using Examples and Comparative Examples. However, the present invention is not limited to these Examples and Comparative Examples.

[1] Measurement Method

First, a measurement method in the following Examples and Comparative Examples will be described.

(1) Particle Size Distribution

The particle size distribution of a sulfide-based inorganic solid electrolyte material obtained in each of Examples and Comparative Examples was measured with a laser diffraction method using a laser diffraction scattering particle size distribution analyzer (manufactured by Malvern Panalytical Ltd., Mastersizer 3000). Based on the measurement result, a particle size corresponding to a 50% cumulative value ($d_{50}$, average particle size) in the weight cumulative distribution of the sulfide-based inorganic solid electrolyte material was obtained.

(2) Quantitative Analysis of Phosphorus (P) and Sulfur (S) in Diphosphorus Pentasulfide Composition Quantitative analysis of phosphorus and sulfur by energy dispersive X-ray analysis (EDX) was performed on the diphosphorus pentasulfide composition obtained in each of Examples and Comparative Examples.

First, in an argon atmosphere, particles having a particle size of 0.5 mm were selected from the inside of the diphosphorus pentasulfide composition and were crushed by being pressed lightly with a pestle. Next, the crushed product of the diphosphorus pentasulfide composition was fixed to a sample pedestal of a scanning electron microscope (S-4700, manufactured by Hitachi Ltd.) using a carbon conductive tape such that a flat surface formed by crushing faced upward, and gold was deposited by sputtering to secure a conductive path with the pedestal. The above-described operation stabilized an image by suppressing charge-up and accelerated the detection of characteristic X-ray. The flat surface of the crushed product of the diphosphorus sulfide composition was observed at a magnification power of 500-fold under conditions of an electron beam acceleration voltage of 15 kV, an emission current of 10±1 μA, and a work distance of 12 mm. Semi-quantitative analysis of phosphorus (P) and sulfur (S) was performed using an energy dispersive spectrometer (EMAX-7000, manufactured by Horiba Ltd.).

In the semi-quantitative analysis, characteristic X-rays were measured under conditions of an electron beam acceleration voltage of 15 kV, an electron beam incidence angle of 90°, an X-ray take-off angle of 35°, a pulse processing time of P3, a dead time of 10% to 30%, a measurement time of 300 seconds. By setting background points to 0.67, 1.14, 1.70, 2.86, and 4.04 keV, the semi-quantitative analysis was performed under quantitative analysis conditions of quantitative correction method: standardless φ (ρz), peak separation method: overlap factor method, no normalization of mass concentration, no normalization of atomic number, and no low energy GB correction. The concentrations of phosphorus (P) and sulfur (S) were measured from an observed visual field of 0.25 mm×0.17 mm at any five positions of the flat surface on the crushed product of the diphosphorus sulfide composition, and the average value thereof was adopted.

(3) DSC Measurement

The DSC measurement was performed as follows on the diphosphorus pentasulfide composition obtained in each of Examples and Comparative Examples. First, in an argon atmosphere, 20 to 25 mg of the diphosphorus pentasulfide composition was weighed in an aluminum pan to prepare a sample. The aluminum pan was sealed with an aluminum cover. Next, differential scanning calorimetry was performed on the sample using a differential scanning calorimeter (DSC6300, manufactured by Seiko Instruments Inc.) under conditions of a start temperature of 25° C., a measured temperature range of 30° C. to 350° C., a temperature increase rate of 5° C./min, and an argon atmosphere with a flow rate of 100 ml per minute. Based on the DSC curve obtained as described above, whether or not an endothermic peak was present in a temperature range of 280° C. or higher and 300° C. or lower, a heat of fusion (J/g) of the endothermic peak, a half-width (° C.) of the endothermic peak, and a peak temperature, that is, a melting point (° C.) of the endothermic peak were calculated.

The heat of fusion of the above-described endothermic peak was calculated by obtaining the area of a region surrounded by a melting endothermic curve including an endothermic peak and a baseline. The baseline in the endothermic peak was a line obtained by connecting a point R and a point S in FIG. 2 to each other.

Figure 3:
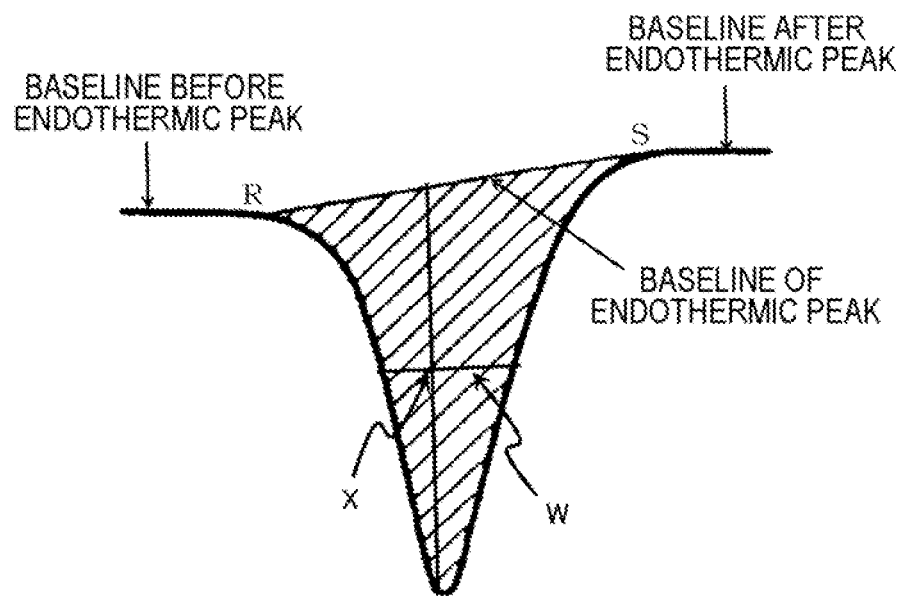
FIG. 3 is a diagram showing a baseline used when a half-width of an endothermic peak is calculated.

In addition, the half-width of the endothermic peak was calculated by obtaining a temperature width W at an intermediate point X in the endothermic peak. The baseline in the endothermic peak was a line obtained by connecting a point R and a point S in FIG. 3 to each other.

(4) Measurement of Composition Ratio in Sulfide-Based Inorganic Solid Electrolyte Material Mass % of each of Li, P, and S in the sulfide-based inorganic solid electrolyte material obtained in each of Examples and Comparative Examples was obtained by ICP Emission Spectroscopy using an ICP emission spectrometer (SPS3000, manufactured by Seiko Instruments Inc.). Based on the obtained values, a molar ratio between the respective elements was calculated.

(5) Measurement of Lithium Ionic Conductivity

In each of the sulfide-based inorganic solid electrolyte material obtained in each of Examples and Comparative Examples, the lithium ionic conductivity was measured using an alternating current impedance method.

For the measurement of the lithium ionic conductivity, a potentiostat/galvanostat SP-300 (manufactured by Bio-Logic Sciences Instruments) was used. The size of the sample was diameter: 9.5 mm and thickness: 1.2 to 2.0 mm. Measurement conditions were applied voltage: 10 mV, measurement temperature: 27.0° C., and measurement frequency range: 0.1 Hz to 7 MHz, and electrode: Li foil.

Here, 150 mg of the powdery sulfide-based inorganic solid electrolyte material obtained in each of Examples and Comparative Examples was pressed using a press machine at 270 MPa for 10 minutes, and the plate-shaped sulfide-based inorganic solid electrolyte material having a diameter of 9.5 mm and a thickness of 1.2 to 2.0 mm was obtained and used as the sample for the measurement of the lithium ionic conductivity.

In addition, the sulfide-based inorganic solid electrolyte material obtained in each of Examples and Comparative Examples was put into a glass sealed bottle and was stored in an argon glove box where $H_2O$<1 ppm and $O_2$<1 ppm. The lithium ionic conductivity was initially measured, and the lithium ionic conductivity of the sulfide-based inorganic solid electrolyte material was measured using the same method as described above 150 days after the initial measurement, and a decrease rate (%) in ionic conductivity was obtained.

[2] Manufacturing of Solid Electrolyte Material

The sulfide-based inorganic solid electrolyte material was prepared according to the following procedure.

Regarding the raw materials, $Li_2S$ (manufactured by Furukawa Co., Ltd., purity: 99.9%) and $Li_3N$ (manufactured by Furukawa Co., Ltd.) were used, and $P_2S_5$ obtained in each of Examples and Comparative Examples was used as $P_2S_5$.

First, a rotary blade crusher and an alumina pot (inner volume: 400 mL) were disposed in the glove box. Next, injection and evacuation of high-purity dry argon gas ($H_2O$<1 ppm, $O_2$<1 ppm) obtained by a gas purification device were performed three times in the glove box.

Next, using the rotary blade crusher (rotation speed: 18000 rpm), 5 g in total of $Li_2S$ powder, $P_2S_5$ powder, and $Li_3N$ powder ($Li_2S:P_2S_5:Li_3N$=71.1:23.7:5.3 (mol %)) were mixed (an operation of mixing the powders for 10 seconds and leaving the powders to stand for 10 seconds was performed 10 times (cumulative mixing time: 100 seconds) in the glove box. As a result, a raw material inorganic composition was prepared.

Next, Next, the raw material inorganic composition and 500 g of $ZrO_2$ balls having a diameter of 10 mm were put into the alumina pot (inner volume: 400 mL) in the glove box, and the pot was sealed.

Next, the alumina pot was taken out from the glove box, the alumina pot was attached to a ball mill placed in an atmosphere of dry air introduced through a membrane air dryer, and a mechanochemical process was performed at 120 rpm for 500 hours such that the raw material inorganic composition was vitrified. Whenever the powders were mixed for 48 hours, the powder was scraped off from the inner wall of the pot in the glove box. After sealing the pot, milling was continued in a dry air atmosphere.

Next, the alumina pot was put into the glove box, and the obtained powder was transported from the alumina pot to a carbon crucible and was annealed in a heating furnace disposed in the glove box at 290° C. for 2 hours.

The obtained sulfide-based inorganic solid electrolyte material was evaluated in various ways. The obtained results are shown in Table 1.

[3] Manufacturing of $P_2S_5$

Example 1

As the raw material composition of diphosphorus pentasulfide, diphosphorus pentasulfide (trade name: SUPERIOR GRADE Powder, manufactured by Liaoning Ruixing Chemical Group) was used.

Next, the raw material composition of diphosphorus pentasulfide was put into a quartz container and set to a vacuum heating device (manufactured by Furukawa Co., Ltd.). Next, the raw material composition of diphosphorus pentasulfide was heated in a vacuum under reduced pressure of −0.094 MPa at 300° C. for 2 hours. Next, the component accumulated in the bottom of the quartz container was collected to obtain a diphosphorus pentasulfide composition 1. The obtained diphosphorus pentasulfide composition 1 was evaluated in various ways. The obtained results are shown in Table 1.

Example 2

As the raw material composition of diphosphorus pentasulfide, diphosphorus pentasulfide (trade name: SUPERIOR GRADE Flake, manufactured by Liaoning Ruixing Chemical Group) was used.

Next, the raw material composition of diphosphorus pentasulfide was put into a quartz container and set to a vacuum heating device (manufactured by Furukawa Co., Ltd.). Next, the raw material composition of diphosphorus pentasulfide was heated in a vacuum under reduced pressure of −0.094 MPa at 300° C. for 2 hours. Next, the component accumulated in the bottom of the quartz container was collected to obtain a diphosphorus pentasulfide composition 2. The obtained diphosphorus pentasulfide composition 2 was evaluated in various ways. The obtained results are shown in Table 1.

Example 3

As the raw material composition of diphosphorus pentasulfide, diphosphorus pentasulfide (trade name: SUPERIOR GRADE Powder and Flake 1, manufactured by Liaoning Ruixing Chemical Group) was used.

Next, the raw material composition of diphosphorus pentasulfide was put into a quartz container and set to a vacuum heating device (manufactured by Furukawa Co., Ltd.). Next, the raw material composition of diphosphorus pentasulfide was heated in a vacuum under reduced pressure of −0.094 MPa at 300° C. for 2 hours. Next, the component accumulated in the bottom of the quartz container was collected to obtain a diphosphorus pentasulfide composition 3. The obtained diphosphorus pentasulfide composition 3 was evaluated in various ways. The obtained results are shown in Table 1.

Example 4

As the raw material composition of diphosphorus pentasulfide, diphosphorus pentasulfide (trade name: SUPERIOR GRADE Powder and Flake 2, manufactured by Liaoning Ruixing Chemical Group) was used.

Next, the raw material composition of diphosphorus pentasulfide was put into a quartz container and set to a vacuum heating device (manufactured by Furukawa Co., Ltd.). Next, the raw material composition of diphosphorus pentasulfide was heated in a vacuum under reduced pressure of −0.094 MPa at 300° C. for 2 hours. Next, the component accumulated in the bottom of the quartz container was collected to obtain a diphosphorus pentasulfide composition 4. The obtained diphosphorus pentasulfide composition 4 was evaluated in various ways. The obtained results are shown in Table 1.

Example 5

As the raw material composition of diphosphorus pentasulfide, diphosphorus pentasulfide (manufactured by Kanto Chemical Co., Inc., trade name: first grade) was used.

Next, the raw material composition of diphosphorus pentasulfide was put into a quartz container and set to a vacuum heating device (manufactured by Furukawa Co., Ltd.). Next, the raw material composition of diphosphorus pentasulfide was heated in a vacuum under reduced pressure of −0.094 MPa at 300° C. for 2 hours. Next, the component accumulated in the bottom of the quartz container was collected to obtain a diphosphorus pentasulfide composition 5. The obtained diphosphorus pentasulfide composition 5 was evaluated in various ways. The obtained results are shown in Table 1.

Example 6

As the raw material composition of diphosphorus pentasulfide, diphosphorus pentasulfide (manufactured by Sigma-Aldrich) was used.

Next, the raw material composition of diphosphorus pentasulfide was put into a quartz container and set to a vacuum heating device (manufactured by Furukawa Co., Ltd.). Next, the raw material composition of diphosphorus pentasulfide was heated in a vacuum under reduced pressure of −0.094 MPa at 300° C. for 2 hours. Next, the component accumulated in the bottom of the quartz container was collected to obtain a diphosphorus pentasulfide composition 6. The obtained diphosphorus pentasulfide composition 6 was evaluated in various ways. The obtained results are shown in Table 1.

Comparative Example 1

As a diphosphorus pentasulfide composition 7, diphosphorus pentasulfide (trade name: SUPERIOR GRADE Powder, manufactured by Liaoning Ruixing Chemical Group) was used as it is. The diphosphorus pentasulfide composition 7 was evaluated in various ways. The obtained results are shown in Table 1.

Comparative Example 2

As a diphosphorus pentasulfide composition 8, diphosphorus pentasulfide (trade name: SUPERIOR GRADE Flake, manufactured by Liaoning Ruixing Chemical Group) was used as it is. The diphosphorus pentasulfide composition 8 was evaluated in various ways. The obtained results are shown in Table 1.

Comparative Example 3

As a diphosphorus pentasulfide composition 9, diphosphorus pentasulfide (trade name: SUPERIOR GRADE Powder and Flake 1, manufactured by Liaoning Ruixing Chemical Group) was used as it is. The diphosphorus pentasulfide composition 9 was evaluated in various ways. The obtained results are shown in Table 1.

Comparative Example 4

As a diphosphorus pentasulfide composition 10, diphosphorus pentasulfide (trade name: SUPERIOR GRADE Powder and Flake 2, manufactured by Liaoning Ruixing Chemical Group) was used as it is. The diphosphorus pentasulfide composition 10 was evaluated in various ways. The obtained results are shown in Table 1.

Comparative Example 5

As a raw material composition of diphosphorus pentasulfide 11, diphosphorus pentasulfide (trade name: S Special, manufactured by Perimeter Solutions) was used as it is. The diphosphorus pentasulfide composition 11 was evaluated in various ways. The obtained results are shown in Table 1.

Comparative Example 6

As a raw material composition of diphosphorus pentasulfide 12, diphosphorus pentasulfide (trade name: 99%, manufactured by Sigma-Aldrich) was used. The diphosphorus pentasulfide composition 12 was evaluated in various ways. The obtained results are shown in Table 1.

Here, the raw material compositions of diphosphorus pentasulfide manufactured by Liaoning Ruixing Chemical Group, the raw material composition of diphosphorus pentasulfide manufactured by Perimeter Solutions, the diphosphorus pentasulfide raw material composition manufactured by Kanto Chemical Co., Inc., and the raw material composition of diphosphorus pentasulfide manufactured by Sigma-Aldrich used in Examples and Comparative Examples were available as high-purity grade products.

REFERENCE SIGNS LIST

100: lithium ion battery
101: positive electrode active material layer
103: negative electrode active material layer
105: current collector
110: positive electrode
120: electrolyte layer
130: negative electrode

The invention claimed is:

1. A diphosphorus pentasulfide composition for a sulfide-based inorganic solid electrolyte material,
wherein a molar ratio (S/P) of a content of sulfur (S) to a content of phosphorus (P) is 2.40 or higher and 2.49 or lower, and
wherein a melting point of the diphosphorus pentasulfide composition measured using a differential scanning calorimeter is 291° C. or higher.

TABLE 1

| | Properties of Diphosphorus Pentasulfide | | | | | | Properties of Sulfide-Based Inorganic Solid Electrolyte Material | | | | | |
|---|---|---|---|---|---|---|---|---|---|---|---|---|
| | | | | Endothermic | | | | | | | | |
| | P Concentration (at %) | S Concentration (at %) | S/P [-] | Peak in Temperature Range of 280° C. or Higher and 300° C. or Lower | Peak Temperature of Endothermic Peak [° C.] | Heat Quantity of Endothermic Peak [J/g] | Half-Width of Endothermic Peak [° C.] | Composition Ratio Li/P [-] | S/P [-] | $d_{50}$ μm | Lithium Ionic Conductivity [S·cm$^{-1}$] | Lithium Ionic Conductivity after 150 Days [S·cm$^{-1}$] | Decrease Rate in Ionic Conductivity [%] |
| Example 1 | 29.04 | 70.96 | 2.44 | Present | 292.1 | 107.0 | 5.73 | 3.3 | 4.0 | 22 | $1.4 \times 10^{-3}$ | $1.4 \times 10^{-3}$ | 0 |
| Example 2 | 28.94 | 71.06 | 2.46 | Present | 293.7 | 103.0 | 6.58 | 3.3 | 4.0 | 23 | $1.4 \times 10^{-3}$ | $1.4 \times 10^{-3}$ | 0 |
| Example 3 | 29.18 | 70.82 | 2.43 | Present | 292.2 | 104.0 | 6.43 | 3.3 | 4.0 | 21 | $1.4 \times 10^{-3}$ | $1.4 \times 10^{-3}$ | 0 |
| Example 4 | 29.04 | 70.96 | 2.44 | Present | 292.5 | 106.0 | 6.21 | 3.3 | 4.0 | 20 | $1.4 \times 10^{-3}$ | $1.4 \times 10^{-3}$ | 0 |
| Example 5 | 28.69 | 71.31 | 2.49 | Present | 291.0 | 99.0 | 5.02 | 3.3 | 4.0 | 19 | $1.5 \times 10^{-3}$ | $1.5 \times 10^{-3}$ | 0 |
| Example 6 | 28.70 | 71.30 | 2.48 | Present | 291.1 | 99.0 | 4.94 | 3.3 | 4.0 | 23 | $1.5 \times 10^{-3}$ | $1.5 \times 10^{-3}$ | 0 |
| Comparative Example 1 | 28.44 | 71.56 | 2.52 | Present | 289.5 | 62.0 | 3.80 | 3.3 | 4.0 | 22 | $2.7 \times 10^{-4}$ | $2.5 \times 10^{-4}$ | 7.4 |
| Comparative Example 2 | 28.38 | 71.62 | 2.52 | Present | 289.4 | 63.0 | 3.68 | 3.3 | 4.0 | 24 | $3.5 \times 10^{-4}$ | $3.3 \times 10^{-4}$ | 5.7 |
| Comparative Example 3 | 28.30 | 71.70 | 2.53 | Present | 287.7 | 67.0 | 3.92 | 3.3 | 4.0 | 23 | $4.1 \times 10^{-4}$ | $4.0 \times 10^{-4}$ | 2.4 |
| Comparative Example 4 | 28.39 | 71.61 | 2.52 | Present | 290.2 | 67.0 | 3.96 | 3.3 | 4.0 | 21 | $6.3 \times 10^{-4}$ | $6.2 \times 10^{-4}$ | 1.6 |
| Comparative Example 5 | 28.38 | 71.62 | 2.52 | Present | 289.0 | 61.0 | 3.26 | 3.3 | 4.0 | 20 | $4.7 \times 10^{-4}$ | $4.3 \times 10^{-4}$ | 8.5 |
| Comparative Example 6 | 28.41 | 71.59 | 2.52 | Present | 289.3 | 58.0 | 3.27 | 3.3 | 4.0 | 24 | $3.7 \times 10^{-4}$ | $3.3 \times 10^{-4}$ | 10.8 |

In the sulfide-based inorganic solid electrolyte material obtained by using the diphosphorus pentasulfide composition according to each of Examples as a raw material, the lithium ionic conductivity and the stability over time were higher than those of the sulfide-based inorganic solid electrolyte material obtained by using the diphosphorus pentasulfide composition according to each of Comparative Examples as a raw material.

Figure 4:
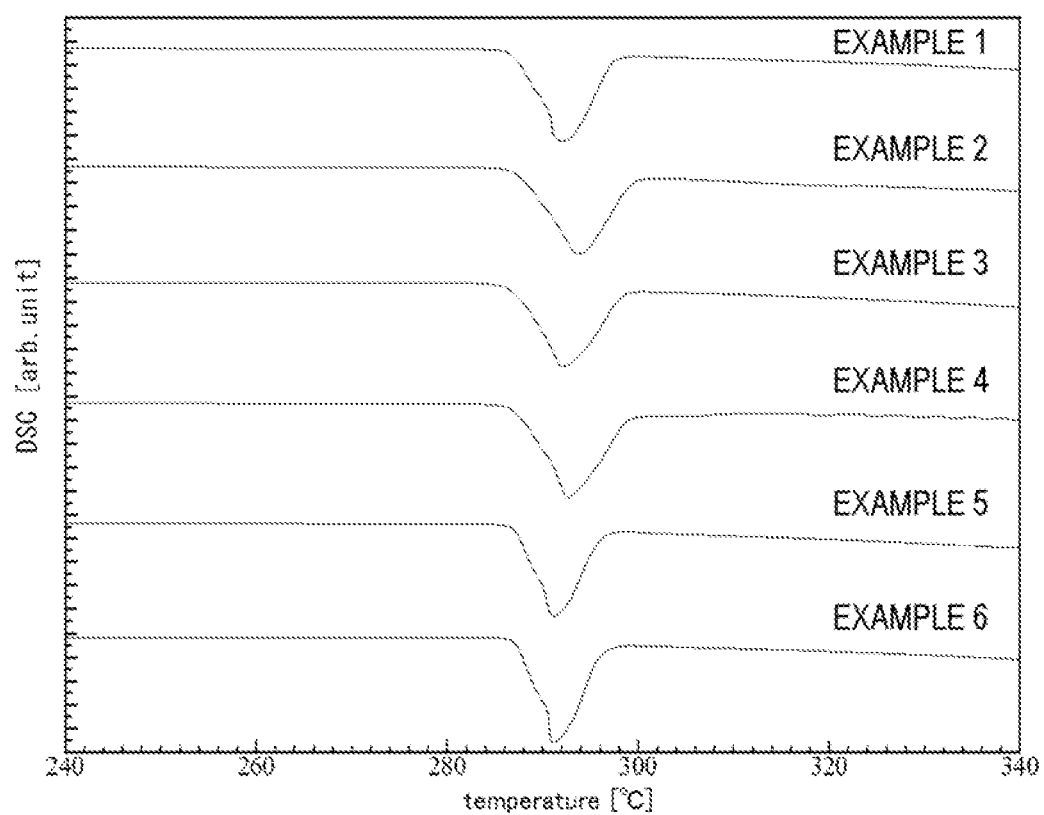
FIG. 4 is a diagram showing DSC curves of diphosphorus pentasulfide compositions obtained in Examples.
Figure 5:
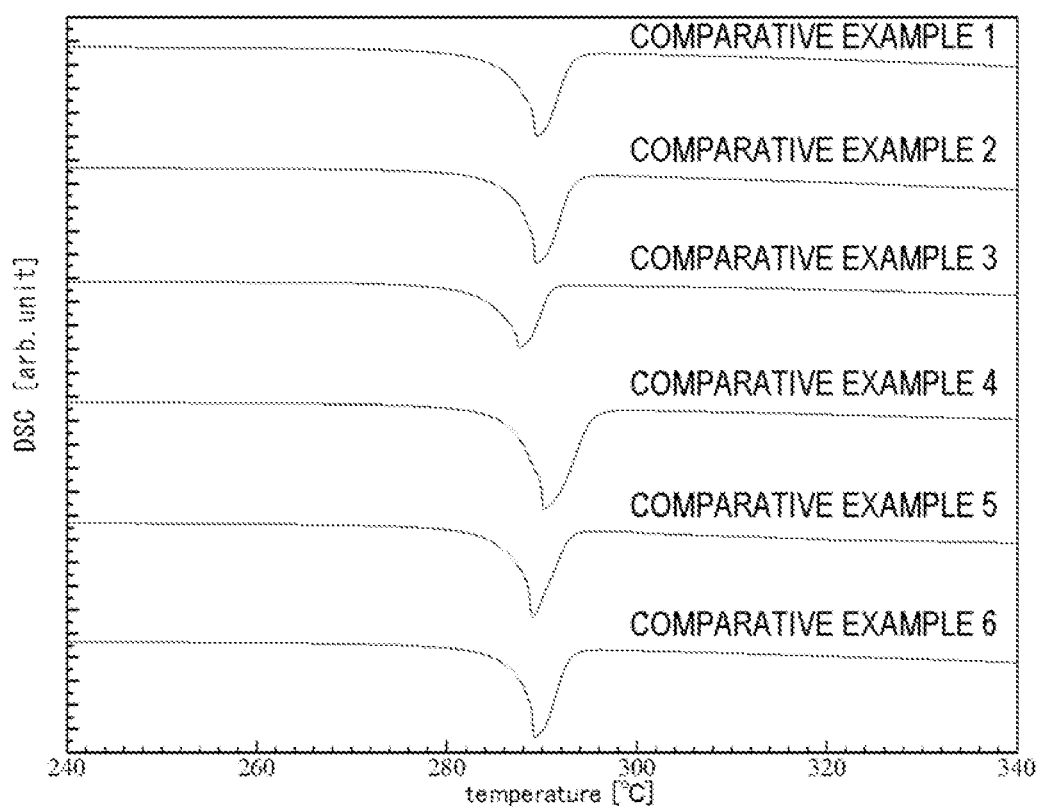
FIG. 5 is a diagram showing DSC curves of diphosphorus pentasulfide compositions obtained in Comparative Examples.

Here, FIGS. 4 and 5 illustrate the DSC curves of the diphosphorus pentasulfide compositions in Examples and Comparative Examples, respectively.

The present application claims priority based on Japanese Patent Application No. 2019-066562 filed on Mar. 29, 2019 and Japanese Patent Application No. 2019-066563 filed on Mar. 29, 2019, the entire contents of which are incorporated herein by reference.

2. The diphosphorus pentasulfide composition according to claim 1,
wherein in a DSC curve of the diphosphorus pentasulfide composition obtained by measurement using a differential scanning calorimeter under conditions of a start temperature of 25° C., a measured temperature range of 30° C. to 350° C., a temperature increase rate of 5° C./min, and an argon atmosphere with a flow rate of 100 ml per minute, an endothermic peak is shown in a temperature range of 280° C. or higher and 300° C. or lower, and a half-width of the endothermic peak is 4.1° C. or higher.

3. A diphosphorus pentasulfide composition for a sulfide-based inorganic solid electrolyte material,
wherein in a DSC curve of the diphosphorus pentasulfide composition obtained by measurement using a differential scanning calorimeter under conditions of a start temperature of 25° C., a measured temperature range of 30° C. to 350° C., a temperature increase rate of 5°

C./min, and an argon atmosphere with a flow rate of 100 ml per minute, an endothermic peak is shown in a temperature range of 280° C. or higher and 300° C. or lower, and a half-width of the endothermic peak is 4.1° C. or higher, and wherein a heat of fusion of the endothermic peak is 70 J/g or more.

4. The diphosphorus pentasulfide composition according to claim 3, wherein a melting point of the diphosphorus pentasulfide composition measured using a differential scanning calorimeter is 285° C. or higher.

5. The diphosphorus pentasulfide composition according to claim 3, wherein a heat of fusion of the endothermic peak is 150 J/g or less.

6. The diphosphorus pentasulfide composition according to claim 1 or 3, wherein a content of diphosphorus pentasulfide in the diphosphorus pentasulfide composition is 95 mass % or higher.

7. The diphosphorus pentasulfide composition according to claim 1 or 3, wherein the diphosphorus pentasulfide composition is powdery.

8. A raw material composition of a sulfide-based inorganic solid electrolyte material, the raw material composition comprising:

the diphosphorus pentasulfide composition according to claim 1 or 3; and lithium sulfide.

9. A method of manufacturing a sulfide-based inorganic solid electrolyte material, the method comprising a step of mechanically processing the raw material composition of the sulfide-based inorganic solid electrolyte material according to claim 8.

10. A sulfide-based inorganic solid electrolyte material that is obtained by using the diphosphorus pentasulfide composition according to claim 1 or 3 as a raw material.

11. A solid electrolyte comprising the sulfide-based inorganic solid electrolyte material according to claim 10.

12. A solid electrolyte membrane comprising the solid electrolyte according to claim 11 as a main component.

13. A lithium ion battery comprising:

a positive electrode including a positive electrode active material layer;

an electrolyte layer; and a negative electrode including a negative electrode active material layer, wherein at least one of the positive electrode active material layer, the electrolyte layer, and the negative electrode active material layer includes the sulfide-based inorganic solid electrolyte material according to claim 10.

14. The diphosphorus pentasulfide composition according to claim 1, wherein a melting point of the diphosphorus pentasulfide composition measured using a differential scanning calorimeter is 300° C. or lower.

* * * * *